United States Patent [19]
Meshberg

[11] Patent Number: 5,620,113
[45] Date of Patent: Apr. 15, 1997

[54] DISPENSER AND METHOD OF ITS USE

[76] Inventor: Philip Meshberg, 2770 S. Ocean Blvd. Apartment 602, Palm Beach, Fla. 33480

[21] Appl. No.: 419,499

[22] Filed: Apr. 10, 1995

Related U.S. Application Data

[63] Continuation-in-part of Ser. No. 305,637, Sep. 14, 1994, which is a continuation-in-part of Ser. No. 163,787, Dec. 9, 1993, and Ser. No. 222,975, Apr. 5, 1994, Pat. No. 5,460,207, which is a division of Ser. No. 887,032, May 22, 1992, Pat. No. 5,305,810.

[51] Int. Cl.$^6$ .................................................. B67D 5/40
[52] U.S. Cl. ...................... 222/1; 222/321.4; 222/376; 222/382; 222/464.1
[58] Field of Search .................... 222/1, 464.1, 464.7, 222/321.4, 321.7, 321.9, 376, 382, 385, 402.19, 211

[56] References Cited

U.S. PATENT DOCUMENTS

| | | | |
|---|---|---|---|
| 1,977,360 | 10/1934 | Talbot | 222/382 |
| 2,051,736 | 8/1936 | Misfeldt | 222/464.1 X |
| 2,799,435 | 7/1957 | Abplanalp | 222/394 |
| 3,161,330 | 12/1964 | Sagarin et al. | 222/394 |
| 4,183,449 | 1/1980 | Blake . | |
| 4,277,001 | 7/1981 | Nozawa | 222/321 |
| 4,775,079 | 10/1988 | Grothoff | 222/321.4 |
| 4,821,923 | 4/1989 | Skorka | 222/382 X |
| 4,875,604 | 10/1989 | Czech . | |
| 4,993,606 | 2/1991 | Bolen, Jr. et al. | 222/546 |
| 5,024,355 | 6/1991 | Jouillat et al. . | |
| 5,085,350 | 2/1992 | Sugita | 222/260 |
| 5,158,211 | 10/1992 | Meshberg . | |
| 5,222,636 | 6/1993 | Meuresch | 222/321.4 |
| 5,263,606 | 11/1993 | Dutt et al. . | |

FOREIGN PATENT DOCUMENTS

| | | |
|---|---|---|
| 251939 | 7/1987 | European Pat. Off. . |
| 2649408 | 10/1990 | France . |
| 3147749 | 6/1983 | Germany . |
| 2013774 | 8/1979 | United Kingdom . |

*Primary Examiner*—Kevin P. Shaver
*Attorney, Agent, or Firm*—Kenyon & Kenyon

[57] ABSTRACT

A directional dispensing package which is easily shipped, filled and assembled is disclosed. The package includes a retaining opening into which a modular pump is snap-fit by inserting the modular pump through an open end of the package. The pump may also be sonically welded to the package. The package also includes a upstanding wall portion, which provides a dispensing actuator locking and sealing mechanism, and can include a tamper-evident tab. The package and pump are assembled at a production site, and are thereafter shipped to a filling site with a bottom portion. The package is filled through the open bottom end, and then the bottom portion is sealingly affixed to the package. The package may include an integrally-molded dip tube structure and a bottom portion with specific structure for allowing easy assembly while preventing leakage. The bottom portion may have an integrally molded dip tube structure. Various devices for allowing inverted dispensing are disclosed. Also, various devices for sealing the spray orifice are disclosed. The device of the present invention can be filled and finally assembled with a minimal number of steps, and is therefore particularly suited for quick-turn-around marketing.

6 Claims, 22 Drawing Sheets

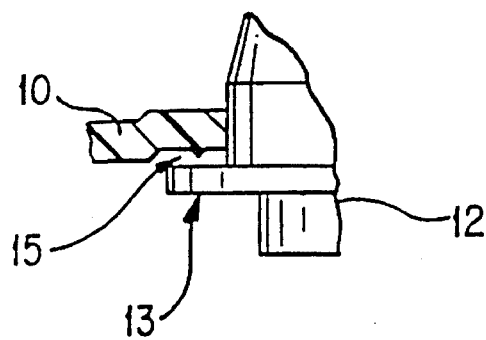
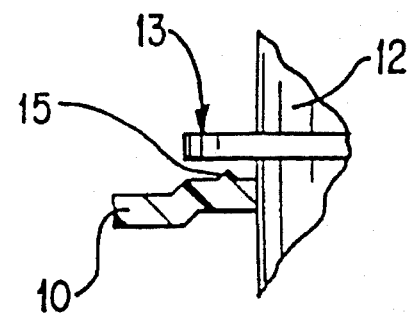
FIG. 2a　　　　　　　FIG. 2b
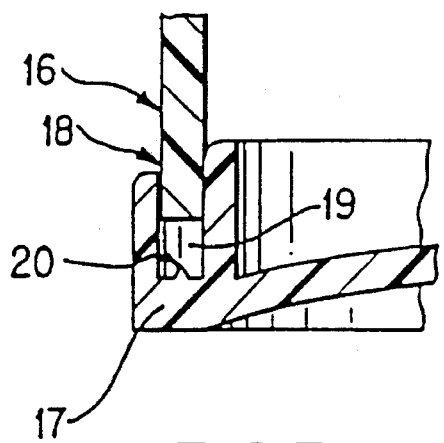
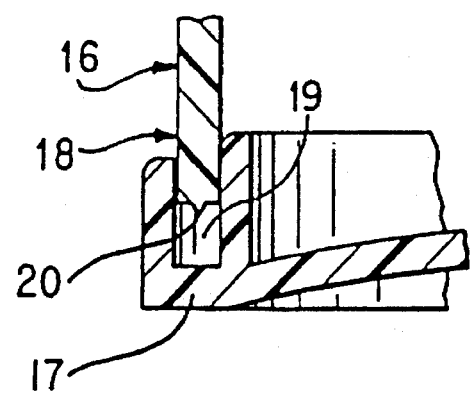
FIG. 3a　　　　　　　FIG. 3b

DISPENSER AND METHOD OF ITS USE

This application is a continuation-in-part of U.S. Pat. application Ser. No. 08/305,637, filed Sept. 14, 1994, which application is a continuation-in-part of U.S. Pat. application Ser. Nos. 08/163,787, filed Dec. 9, 1993 and 08/222,975, now U.S. Pat. No. 5,460,207, which was filed Apr. 5 1994, as a division of U.S. Patent application Ser. No. 07/887,032, filed May 22 1992, now U.S. Pat. No. 5,305,810.

BACKGROUND OF THE INVENTION

1. Field of the Invention

The present invention relates to a complete dispensing package designed to be shipped as an assembled unit to a liquid product marketer, for subsequent filling. The dispensing package is easily filled and bottom sealed with a minimal number of automatic assembly steps. The package of the present invention also includes structure to provide an air seal to the dispensing nozzle and lock the dispensing actuator when it is not in use, and provides a tamper-resistant package. The dispensing package further includes a bottom sealing mechanism adapted for easy assembly, effective sealing, and which allows stacking of the dispensing package upon another dispensing package. The dispensing package may include in one embodiment a dip tube integral with the container portion, which allows for easy filling and assembly. The bottom sealing assembly in another embodiment has mounted integrally thereon a dip tube assembly. This configuration ensures that air will be purged from the dip tube after filling, thereby aiding in priming of the pump. The present invention can also include a device for allowing dispensing in an inverted position of the dispenser. An embodiment of the invention may also include a mounting cup for mounting the pump to the package without the need for screw threads or crimping. The device of the present invention may also include an element for sealing the spray orifice to prevent drying of the contents of the package within the spray orifice, thereby preventing clogging.

2. Description of the Related Art

U.S. Pat. No. 5,158,211 discloses a dispensing package including a modular pump which is assembled into a dispensing package using a snap fit, such that the dispensing pump is permanently retained in the package. In the device disclosed in U.S. Pat. No. 5,158,211, the package is filled through an opening at the top of the package. After filling, the pump is attached to the package, either by snap-fitting the pump structure into a retaining opening, or by adding the pump to the package using a conventional screw-cap mounting. Accordingly, in the device of U.S. Pat. No. 5,158,211, the assembled pump structure and the package must be shipped unassembled to a filling and assembly site, where the package is filled and the pump is then assembled to the package. The invention of U.S. Pat. No. 5,158,211 also includes a mechanism for sealing the outlet nozzle when the dispenser is not in use, and a mechanism for making the dispenser tamper-resistant, to thereby prevent placing any foreign substances or liquids into the package after it is sealed, and also to prevent accidental discharge of liquid. The mechanism for sealing the dispensing orifice prevents drying of the contents of the container in the spray orifice, thereby preventing clogging of the spray orifice. However, the device of U.S. Pat. No. 5,128,211 requires that the actuator be rotated to a non-dispensing position for the sealing device to seal the orifice. Furthermore, the device of that patent has a break-away tab for the dispensing position. Such a break-away tab leaves an opening in the actuator shroud which can be the repository for dirt or dust.

U.S. Pat. No. 5,305,810 describes a method and apparatus for filling a dispensing package with a highly viscous product. In the method of that patent, the package is filled through a dip tube structure which is inserted into the package prior to filling.

U.S. Pat. No. 5,392,962, the disclosure of which is incorporated herein by reference, discloses two designs of a pump which is constructed entirely of a plastic material, to make the pump easily recyclable.

SUMMARY OF THE INVENTION

The present invention is a package-dispensing unit combination designed for easy filling and post-filling assembly, and which can be efficiently shipped to a liquid product producer and to a post-filling marketer. The device of the present invention is especially suitable for promotional purposes, since the liquid product producer need only fill the package and snap on a bottom piece to the package, which may be labeled before or after the filling process. The device of the present invention is ideally suited for allowing directional dispensing of liquid products. The device is thus particularly suited to a quick-turnaround filling and marketing operation, and the assembled and filled packages can be shipped in the same cartons as the unfilled packages were shipped to the liquid product producer. Accordingly, the present invention eliminates waste in carton usage, preventing the need to use different cartons for the containers, pumps and the filled package.

In one embodiment of the present invention, a modular pump is permanently snap-fit or sonically welded in a leak-proof manner into an opening in a retaining wall in the top of the dispensing package, by inserting the pump into either the open bottom or the open top of the package. An actuator can then be assembled onto the package, which package can include a tamper-evidencing feature, as well as structure for locking and sealing the outlet nozzle in a non-dispensing position when not in use. The package can then be shipped to a filling site or to a liquid product producer for filling, final assembly and labelling. At a filling site, the package is inverted, filled from the open bottom, and then a bottom piece is snapped in sealing engagement into the open bottom of the package. The bottom piece can optionally be ultrasonically welded, or sealed with an adhesive, to the package, in such a way that the bottom is permanently retained on the package in a leak-proof manner.

One embodiment of the present invention includes a mechanism for preventing tampering with the contents of the package after it is sealed, and for preventing accidental discharge of the liquid. This feature includes constructing the package so that it is completely sealed after filling. In addition, a snap-off tab is included near the actuator which indicates whether the actuator of the device has been used previously. Also, the device includes a limit stop for preventing actuation of the actuator when locked in a non-dispensing position.

The present invention can be constructed entirely of a plastic material, to make it particularly suitable to recycling. The package can include a spring located between the actuator and the retaining wall. This spring can be constructed of plastic—so that the entire package can be recycled as a unit—or can be constructed of metal—so that the metal spring can be removed from the package easily by simply dislodging the actuator. Both configurations of the present invention make the package easy to recycle.

The present invention includes an embodiment with a dip tube structure which is integrally molded with the package. This construction allows easy assembly and filling of the package, particularly filling the package through the dip tube. As a result, the product is especially useful in dispensing highly viscous products.

The present invention includes several specific structures for the bottom portion which is placed on the package after filling. The construction of this bottom portion allows the package to be easily assembled after filling, yet ensures proper sealing of the package against leakage. The bottom portion can be configured to allow easy stacking of the dispensing package.

The dip tube structure in one embodiment of the present invention ensures that air in the dip tube is purged during the filling and final assembly process, thereby assisting in easing priming of the pump. This is accomplished by forming the dip tube structure integrally with the bottom structure. This arrangement therefore is very useful when it is desired to dispense viscous products from the dispenser.

In another embodiment of the present invention, a mounting cup is used to secure the pump to the package, and the mounting cup is structured in a manner similar to the bottom of the package. This design obviates the need for either a screw-threaded mounting cup for mounting the pump to the package, or the use of conventional crimping techniques. The mounting cup of the present invention may be easily snapped on, while still providing effective sealing of the contents within the package.

The device of the present invention can include several different designs of an element for allowing inverted dispensing from the package. The inverted dispensing device can be adapted to a dip tube which is integral with the package bottom, or a dip tube which is integral with the package. Finally, the device of the present invention can include several different types of elements for sealing the spray orifice on the actuator, which elements do not present any open recesses for the collection of dirt or dust.

BRIEF DESCRIPTION OF THE DRAWINGS

Other objects and advantages of the invention will be apparent from the specification and claims, when considered in connection with the attached sheets of drawings, illustrating one form of the invention, wherein like characters represent like parts and in which:

FIGS. 2a and 2b show detail cross-sectional views of the pump and retaining opening of the present invention, showing the energy director feature for sonic welding;

FIGS. 3a and 3b show detail cross-sectional views of the lower end of the container and the bottom portion which is secured to the container of the present invention, showing the energy director feature;

DETAILED DESCRIPTION OF THE INVENTION

Figure 1:
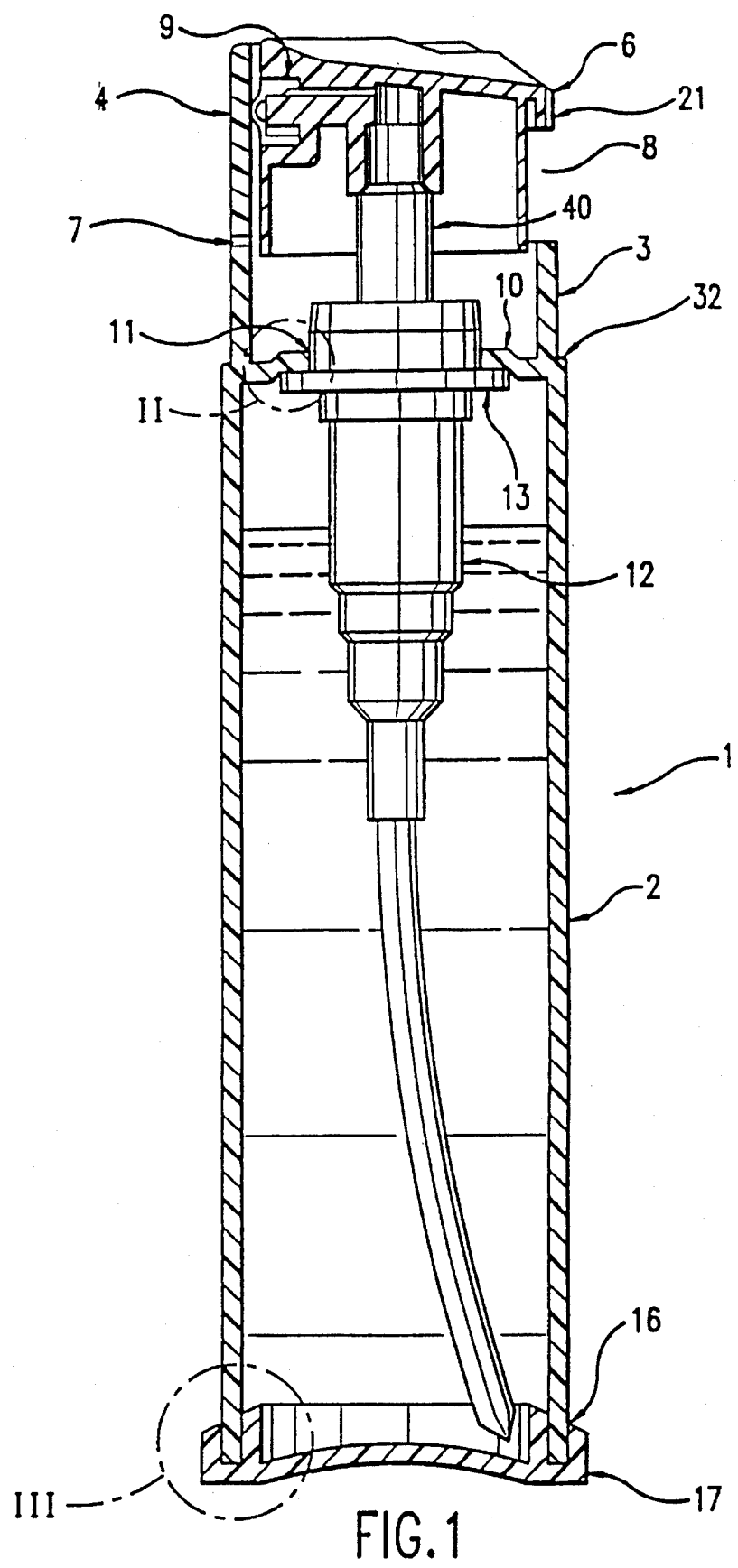
FIG. 1 is a cross-sectional view of one embodiment of the present invention, with the pump inserted and the bottom closure sealed.

A first embodiment of the present invention is shown in cross-sectional view, in a sealed condition, in FIG. 1. The present invention includes a package 1 which includes a container portion 2 and an upstanding wall portion 3. Upstanding wall portion 3 includes a tamper evident tab portion 4, connected to the upstanding wall portion 3 by a snap-away or tear-away joint 7. Joint 7 is originally molded to integrally connect tab portion 4 to upstanding wall 3, but is designed to be of sufficient thinness so that an end user can ultimately break the joint 7 so that the tab portion 4 can be removed from sleeve portion 3 to uncover nozzle 9 on actuator 6 when it is desired to first use the dispenser 1. Upstanding wall 3 can include a recess 8 intended to facilitate movement of an actuator nozzle 9 within the upstanding wall 3. Although shown as being vertically oriented in FIG. 1, tab portion 4 could also be oriented in a horizontal direction, with the joint 7 being disposed vertically at one end of the tab 4.

Container portion 2 and upstanding wall 3 are separated by a retaining wall 10 which includes a retaining opening 11 used to secure a pump 12 in the package 1. Pump 12 can be of any conventional design. Pump 12 includes a retention flange 13 for limiting the amount of inward movement of the pump 12 into the container 1 and for providing a surface for an energy director 15 to adhere during a process of sonic or ultrasonic welding. Alternatively, pump could include a retention groove which retains the pump 12 in the package 1 via a snap-fit engagement with retaining wall 10. Pump 12 is inserted into retaining opening 11 through the lower end 16 of container portion 2 or from the upper end including the upstanding wall 3, which is initially open.

FIGS. 2a and 2b show detail views of the pump 12, pump flange 13, retaining wall 10 and energy director 15. Energy director 15 is a molded ridge which—when excited by sonic or ultrasonic vibration of container 2—causes retaining wall 10 and flange 13 to weld together, thereby permanently retaining pump 12 in container portion 2 and sealing the upper end of the container portion 2.

FIGS. 3a and 3b show detail views of the mechanism whereby a bottom portion 17 is attached to lower end 16 of container portion 2. Lower end 16 includes a tapered portion 18 which is shaped so as to fit into a retaining groove 19 in bottom portion 17. Retaining groove 19 or lower end 16 contains, at its lower end, an energy director 20 used to secure and seal bottom portion 17 to the lower end 16 of container portion 2. As with energy director 15, energy director 20 is a molded ridge which when excited by sonic or ultrasonic vibration of container 2 causes lower end 16 and bottom portion 17 to weld together, thereby permanently retaining bottom portion 17 on container portion 2 and sealing the lower end of the container portion 2.

Figure 4:
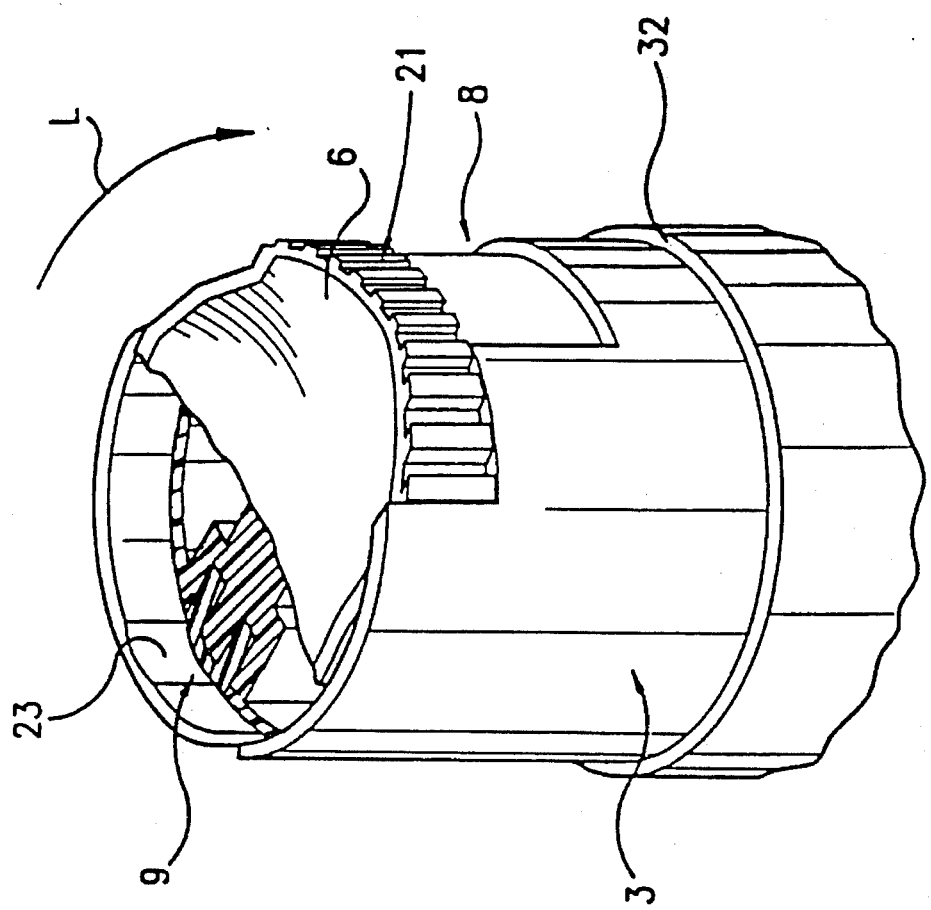
FIGS. 4–6 are perspective views of the actuator and locking mechanisms of the present invention, wherein FIG. 4 includes a partial cross-sectional view.
Figure 6:
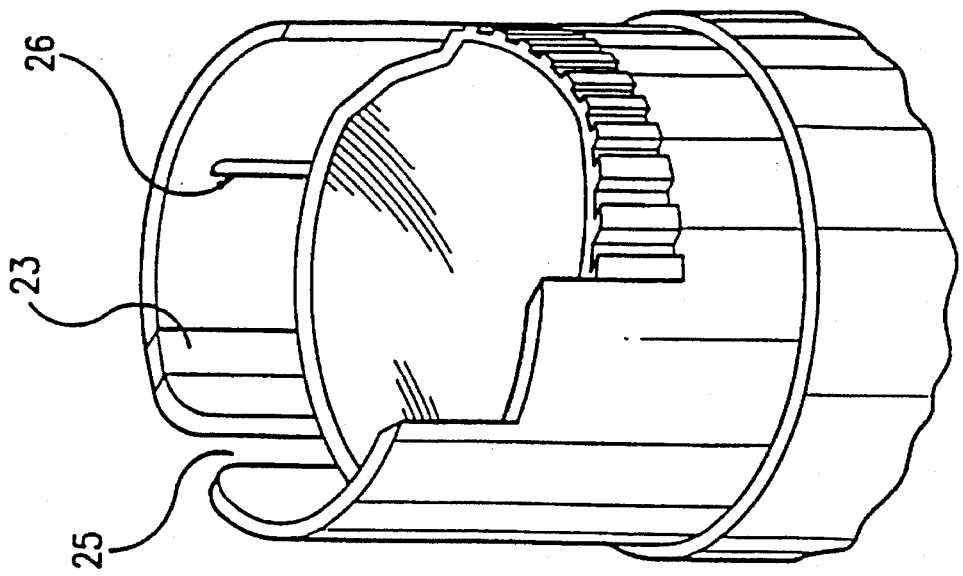
Figure 5:
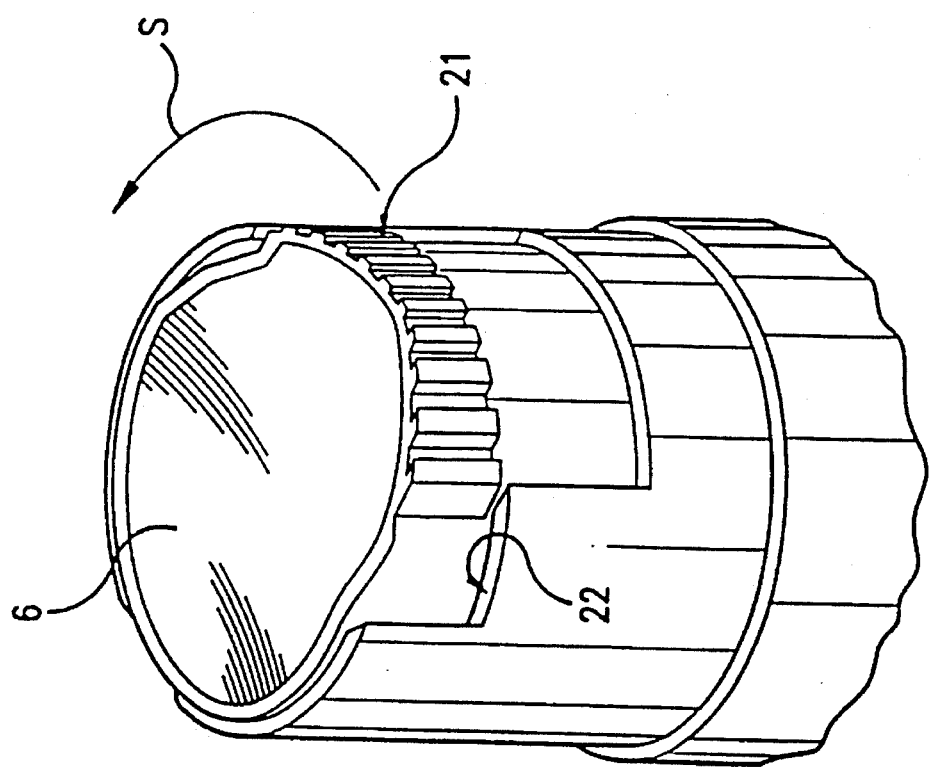

FIGS. 4–6 show the particular features of the actuator 6 of the present device, and the particular locking and retaining features of the upstanding wall 3. In FIG. 4, the forward portion of actuator 6 is shown in cross-sectional view, to show the manner in which the nozzle 9 is sealed in a non-dispensing position. Actuator 6 includes a projecting portion 21 which is used to rotate actuator 6 from a dispensing to a non-dispensing position, and which also acts to prevent downward movement of actuator 6 when actuator 6 is in a non-dispensing position. Upstanding wall 3 includes a limit stop 22 which prevents actuator 6 from moving downward—and thus dispensing material from pump 12—via engagement with limit stop 22 (See FIG. 4). The position of the actuator 6 shown in FIG. 4 is the position in which the actuator 6 is kept before the tab 4 is removed from upstanding wall 3. In this position, nozzle 9, which includes a slightly projecting tip, is snapped into a vertical groove 23. Groove 23 acts to retain nozzle 9 and actuator 6 in a non-dispensing position, and also seals the nozzle 9 against the incursion of air into the nozzle 9 orifice. Rotating actuator 6 in the direction indicated by arrow S places the actuator 6 and nozzle 9 into a spraying or dispensing position. In this position (shown in FIGS. 5 and 6) projecting portion 21 is in alignment with recess 8. In this position, nozzle 9 is aligned with opening 25 which is formed when tab 4 is removed. As seen by comparing FIGS. 5 and 6, projecting portion 21 travels within recess 8 upon downward actuation of actuator 6, allowing dispensing of material through nozzle 9 via pump 12. Rotating actuator 6 in the direction indicated by arrow L initiates a locking position, in which nozzle 9 is snapped into groove 23. Indication that nozzle 9 is properly in a non-dispensing position can be provided via a bead 26, which can coact with a bead on the outer circumferential surface of actuator 6, thereby providing an audible "snapping" sound when the beads slide over one another.

Figures 7, 9:
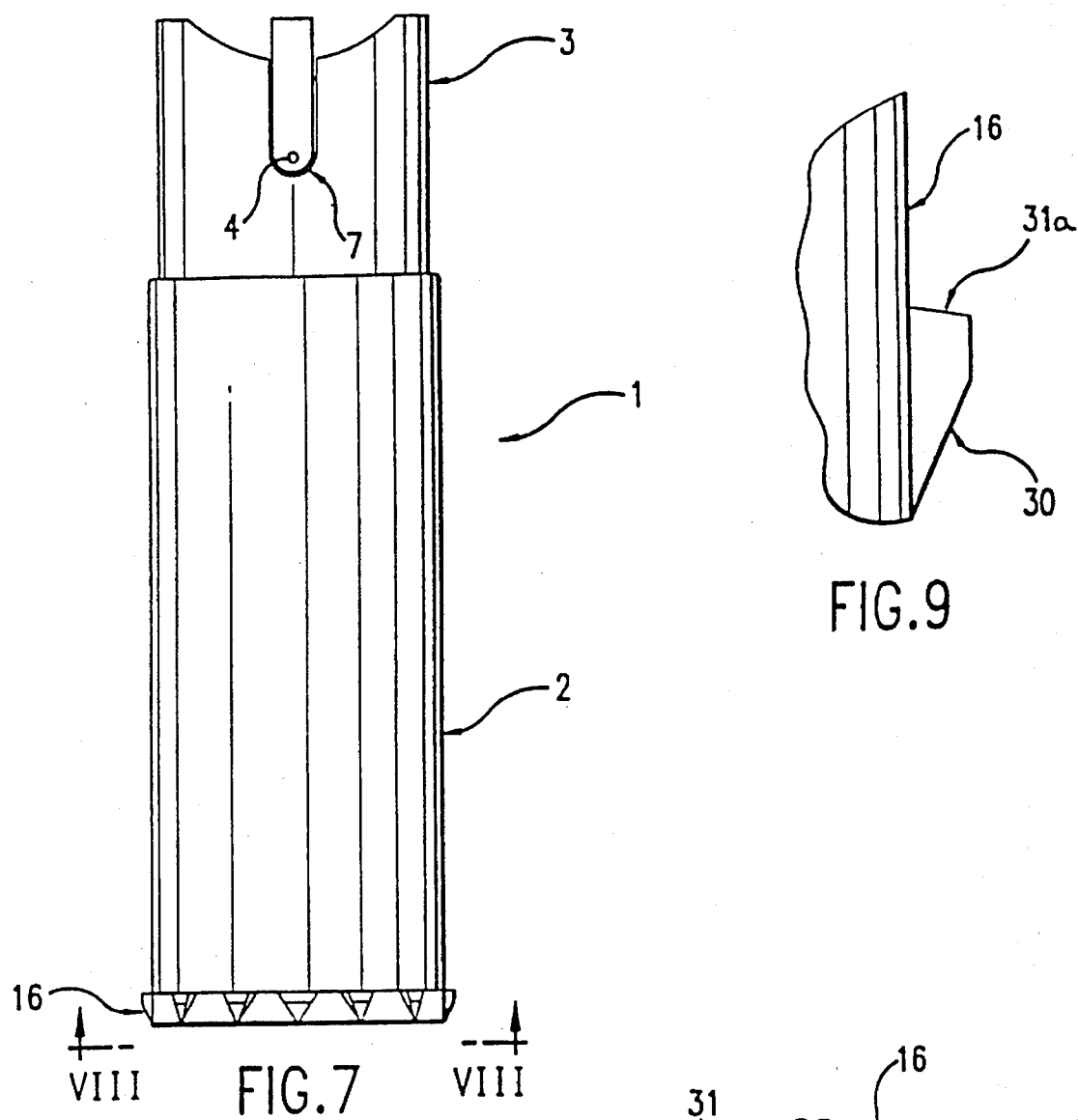
FIG. 7 shows a front view of the container of the present invention, including a second embodiment of the mechanism for attaching the bottom portion to the container.
FIG. 9 is a detail view of the retaining mechanism of FIGS. 7–8.
Figures 8, 10:
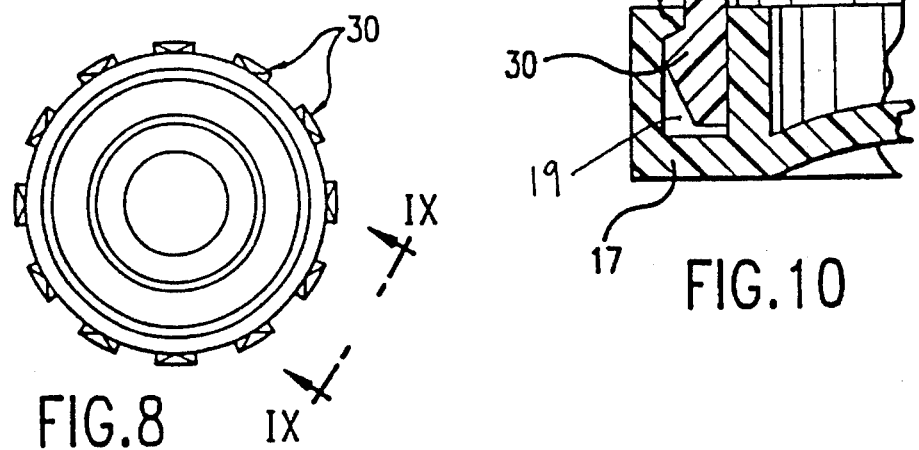
FIG. 8 is a bottom view of the container of FIG. 7.
FIG. 10 is a detail cross-sectional view of the lower end of the container of FIGS. 7–9 and the bottom portion.

FIGS. 7 and 8 show a from and bottom view of the container portion 2 of the present invention, which includes a second embodiment of a mechanism for securing the bottom portion 17 to the container portion 2. Lower end 16 of container portion 2 contains a series of angled tabs 30° Angled tabs 30 are designed to fit into groove 19 in bottom portion 17. Upper end of angled tabs 30 include a generally horizontal surface 31a intended to snap into a horizontally projecting portion 31 on bottom portion 17. Angled tabs 30 and horizontal surface 31a allow bottom portion 17 to be secured horizontally to container portion 2 to thereby ensure good sealing of the bottom portion 17 to the container portion 2 through its entire periphery.

The transition area between container portion 2 and upstanding wall 3 can contain a shoulder 32. Shoulder 32 is useful for an assembly and filling operation of the present invention, as will be described below.

Figure 11:
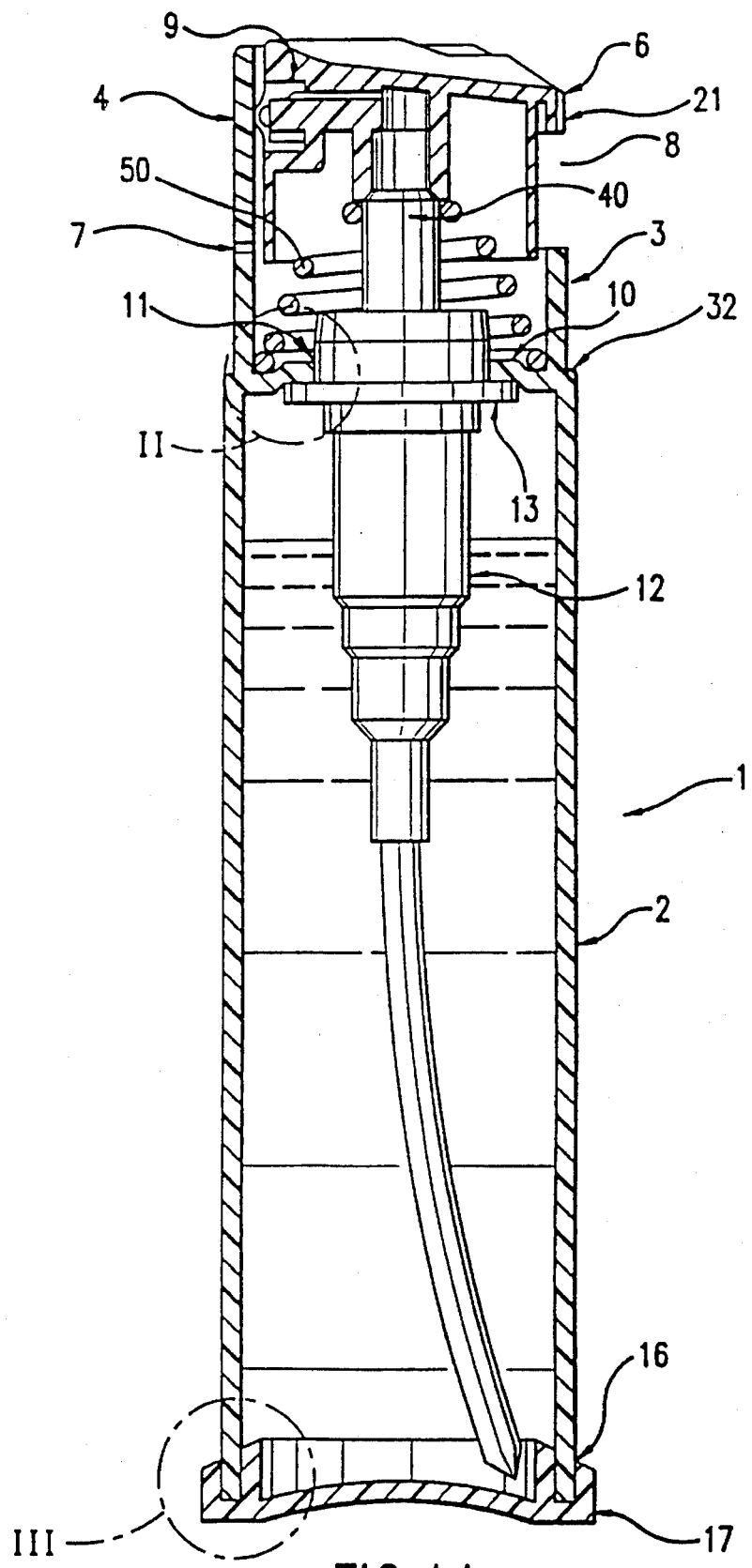
FIG. 11 is a cross-sectional view of a second embodiment of the present invention using a spring between the actuator and the container, with the pump inserted and the bottom closure sealed.

As shown in FIG. 11, the pump spring 50 of the present invention can be located between the retaining wall 10 and the actuator 6, as described in U.S. Pat. No. 5,392,962, the substance of which is incorporated herein by reference. In the configuration of FIG. 11, the spring 50 can be made of a plastic material, making the entire package recyclable, or the spring 50 can be metallic. If the spring 50 is metallic, the package 1 is still easily recyclable, since the metallic spring 50 is easily removed from the package by simply dislodging the actuator 6 and removing the spring 50. The package 1 of the present invention may also be made of a biodegradable plastic material, so that it has less of an environmental impact.

The method of using the device of FIGS. 1–11 is as follows. The container portion 2 is molded as an integral unit with upstanding wall 3 and retaining wall 10. Container portion 2 is inverted, and preferably inserted into a holding or restraining mechanism which interacts with shoulder 32 to restrain container portion 2 in an inverted position. Next, pump 12 is inserted into either the open end of lower end 16 or upper end including upstanding wall 3 (as described, for example, in U.S. Pat. No. 5,158,211), so that the pump 12 fits through retaining opening 11 until flange 13 abuts retaining wall 10, or until the pump is press-fit into retaining opening 11. If retaining wall 10 contains an energy director 15, container portion 2 is sonically or ultrasonically excited so that energy director 15 welds retaining wall 10 and flange 13 in a sealing relation. Actuator 6 can then be inserted onto the outlet stem 40 of pump 12.

The container portion 2 thus assembled is shipped together with bottom portion 17 in an unassembled condition to a filling and assembly location. When it is desired to fill package 1, container portion 2 is again inverted, preferably by engaging shoulder 32 with a holding device. Container portion 2 is then filled with liquid product through open lower end 16. Bottom portion 17 is then placed on lower end 16. If bottom portion 17 contains an energy director 20, container portion 2 is sonically or ultrasonically excited so that energy director 20 welds bottom portion 17 and lower end 16 in a sealing relation. In the case of lower end 17 including angled tabs 30, bottom portion 17 is inserted onto lower end 16 until portion 31 snaps under angled tabs 30.

After bottom portion 17 is sealed to lower end 16, the package 1 can be labelled and shipped to an end user, or alternatively, package 1 can be labelled before the container portion 2 is shipped to the liquid product marketer. Upon receiving package 1, the customer breaks off tab 4, and then when dispensing is desired, rotates actuator 6 to the position shown in FIG. 5. Downward actuation of actuator 6 dispenses liquid product from package 1, through nozzle 9.

Figure 12:
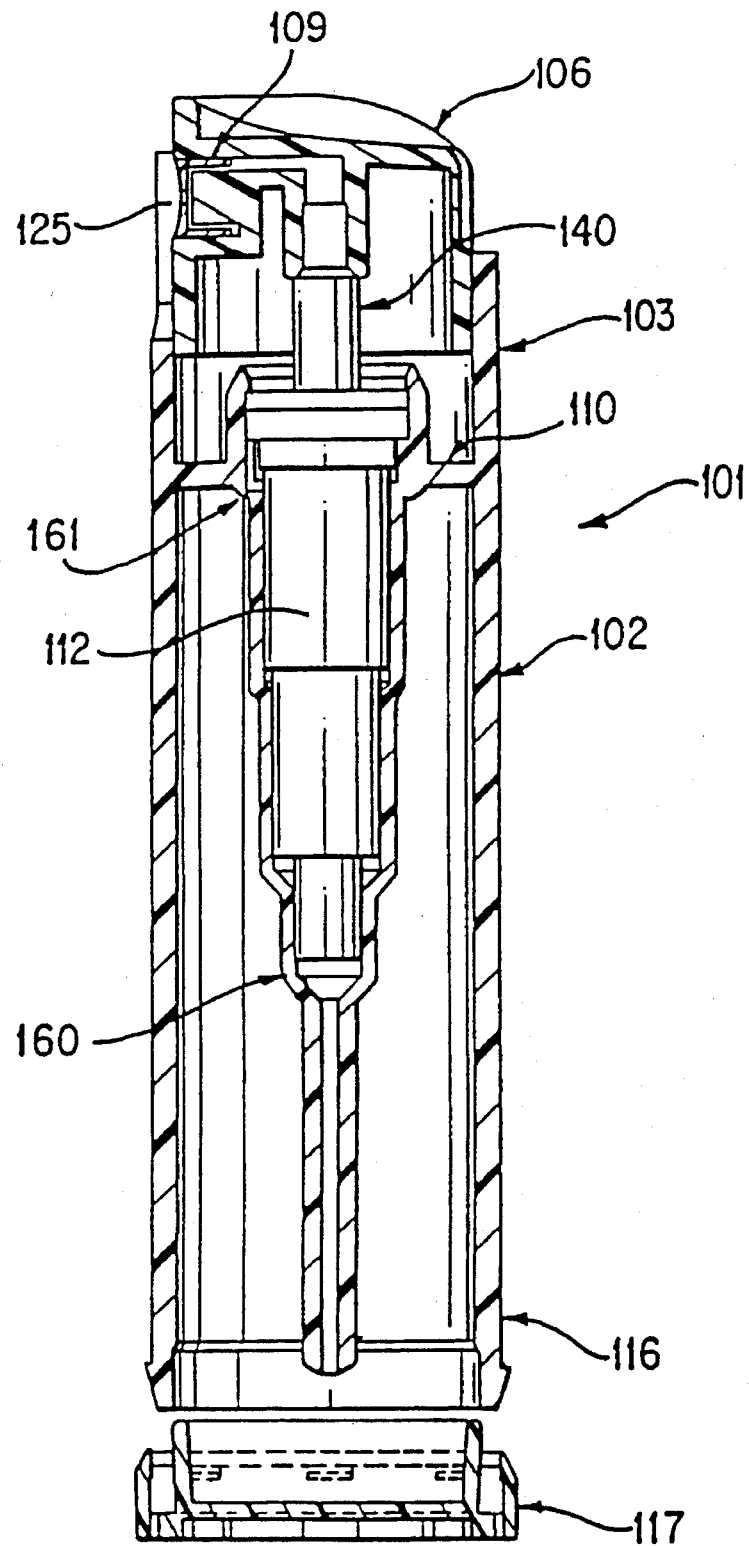
FIG. 12 is a cross-sectional view of a third embodiment of the dispensing package of the present invention in which the dispensing package includes an integrally-molded dip tube structure.

FIG. 12 shows an embodiment of the present invention in which a dip tube structure 160 is integrally molded with container portion 102. Retaining wall 110 in the embodiment of FIG. 12 is integrally molded with dip tube structure 160 to form a one-piece unit. Dip tube structure 160 includes a venting hole or slot 161, which allows air to escape from container during filling, when filling is accomplished through dip tube structure 160 after bottom portion 117 is secured to container portion 102. The method of filling container 102 through dip tube structure 160 and subsequently assembling pump 12 on container 102 is described in detail in U.S. Pat. No. 5,305,810, the disclosure of which is incorporated herein by reference. The configuration shown in FIG. 12 incorporating an integrally molded dip tube structure 160 is particularly useful for viscous products, for which there may be difficulty in priming the pump, as described in U.S. Pat. No. 5,305,810. The container 101, of course, may also be filled through the bottom, as described hereinabove, after insertion and securement of the pump 112 onto container portion 102. Pump 112 may be secured to container portion 102 either by a conventional snap or interference fit between the exterior of pump 102 and the retaining wall 110 or dip tube structure 160, or by ultrasonic welding using energy directors, as discussed hereinabove.

Figure 13:
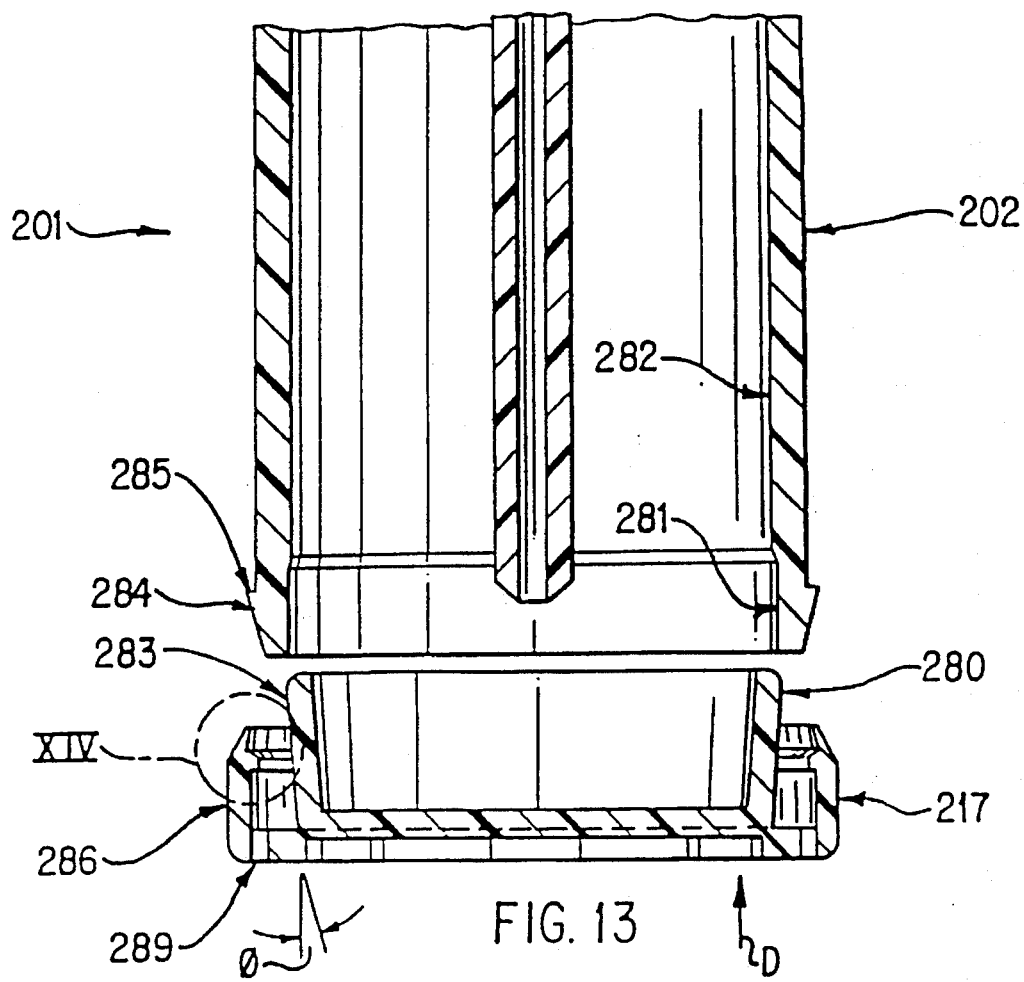
FIG. 13 is a cross-sectional detail view of the bottom of a third embodiment of the bottom portion of the dispensing package of the present invention, in an unassembled exploded view.
Figure 14:
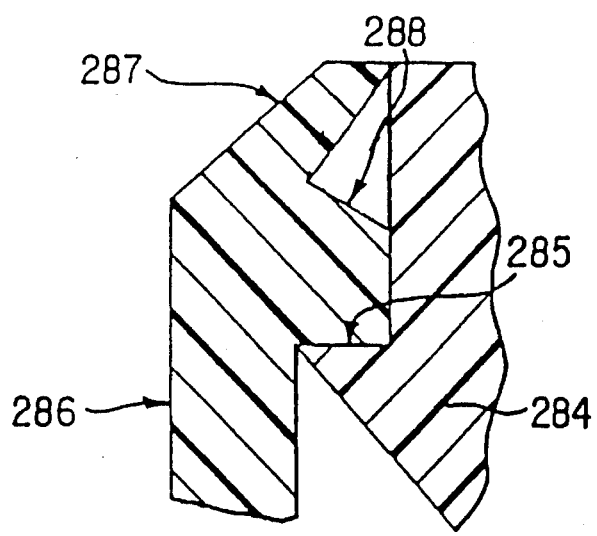
FIG. 14 is a detail cross-sectional view of the rim seal of the bottom portion of the dispensing package of the embodiment of FIG. 13.

FIGS. 13 and 14 show an alternative embodiment container portion 202 and bottom portion 217 used in the present invention. The bottom portion 217 in the embodiment of FIGS. 13 and 14 is particularly effective in ensuring a leakproof seal at the bottom of container portion 202. Bottom portion 217 includes an interior piston portion 280, which slides in and seals against an interior sealing surface 281 of container portion 202. Interior sealing surface 201 can be slightly inset from interior surface 282 of container portion 202. Interior piston portion 280 includes a tapered sealing surface 283 extending at an angle φ from vertical. Tapered sealing surface 283 ensures a good leakproof seal of interior piston portion 280 against interior sealing surface 281. Container portion 202 also includes, at its lower end, angled snap rim 284 extending around the entire circumference of container portion 202. Snap rim 284 includes an upper snap surface 285. Bottom portion 217 includes an exterior snap flange 286 which is used to secure and seal bottom portion 217 to container portion 202. Snap flange 286 includes, at its upper end, an angled snap lip 287 extending around the entire circumference of snap flange 286, and a series of snap fingers 288 spaced circumferentially around the interior of snap flange 286. Snap fingers 288 engage with snap surface 285 on snap rim 284 to thereby secure bottom portion 217 to container portion 202. Snap lip 287 generally contacts the exterior of container portion 202 to thereby ensure a good leakproof seal of bottom portion 217 to container portion 202. Bottom portion 217 may include openings 289 to allow proper molding of snap fingers 288 on snap flange 286.

During assembly, bottom portion 217 is slid onto container portion 202 in direction D. As bottom portion slides in direction D, sealing surfaces 281 and 283 engage and seal against one another. As bottom portion 217 moves further in direction D, first snap lip 287 and then snap fingers 288 move around snap rim 284. After snap fingers 288 move around snap rim 284, snap fingers 288 snap into engagement with snap surface 285 to secure bottom portion 217 to container portion 202, and snap lip 287 snaps into engagement with the exterior of container portion 202. As a result, bottom portion 217 is sealed and secured to container portion 202.

Figure 15:
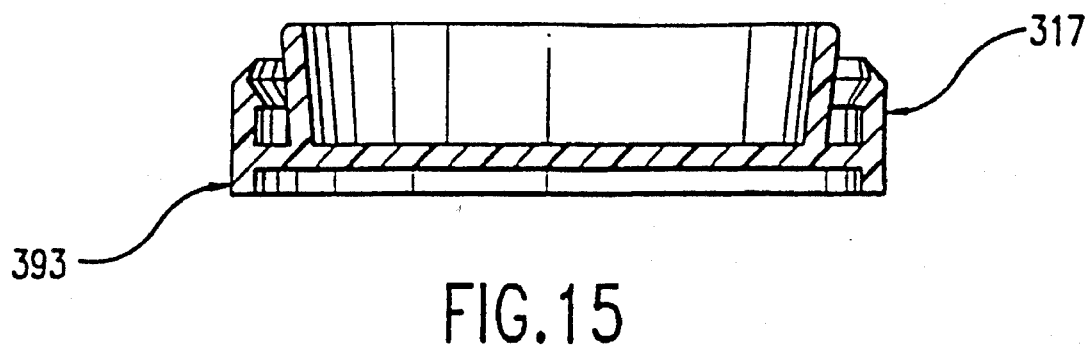
FIG. 15 is a cross-sectional view of a fourth embodiment of the bottom portion of the present invention.
Figure 16:
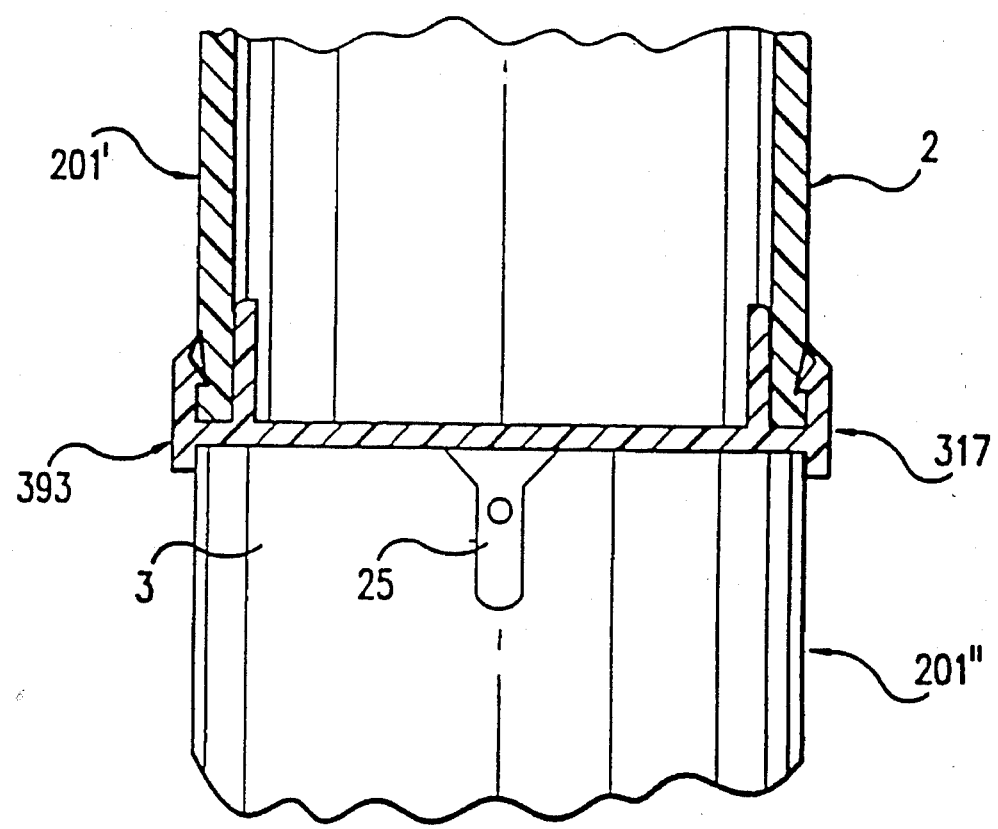
FIG. 16 is a detail view of the embodiment of FIG. 15, showing the manner in which stacking is accomplished.

FIGS. 15 and 16 show an alternative configuration of the bottom portion which allows the container to be easily stacked. Bottom portion 317 in the embodiment of FIGS. 15 and 16 has a stacking flange 393 which is shaped so as to receive upstanding wall 3, as shown in FIG. 16. Accordingly, as shown in FIG. 16, a first container 201' may be easily stacked and secured upon a second container 201".

Figure 17:
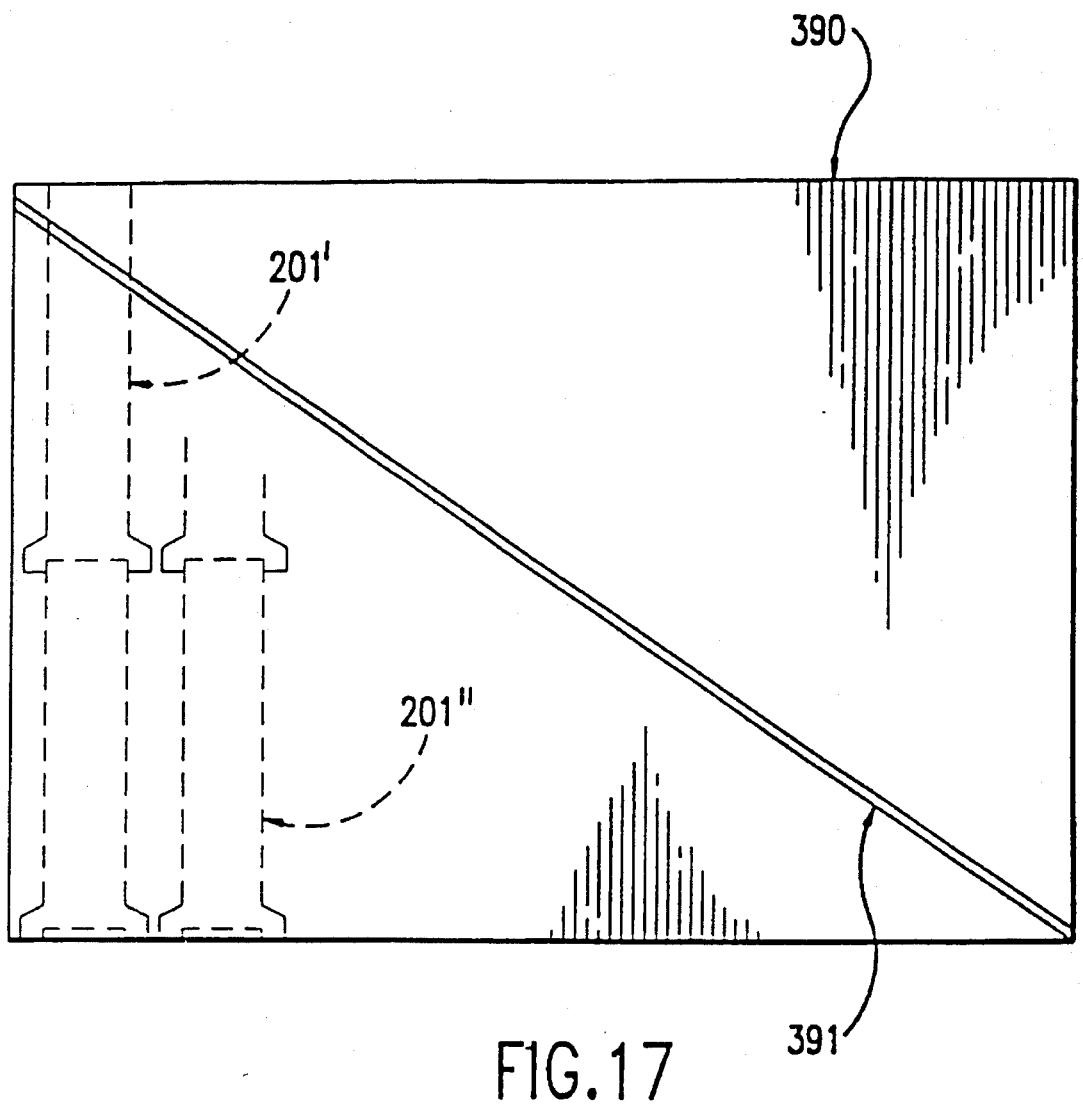
FIG. 17 is a side view of a package used with the embodiment of FIGS. 15–16.

FIG. 17 shows an advantageous packaging arrangement for packaging and shipping stacked containers 201', 201" of the type shown in FIGS. 15 and 16. Package 390 is wrapped around a series of stacked containers 201', 201" and includes a tear-strip 391 for unwrapping package 390 and gaining access to containers 201', 201".

Figure 18:
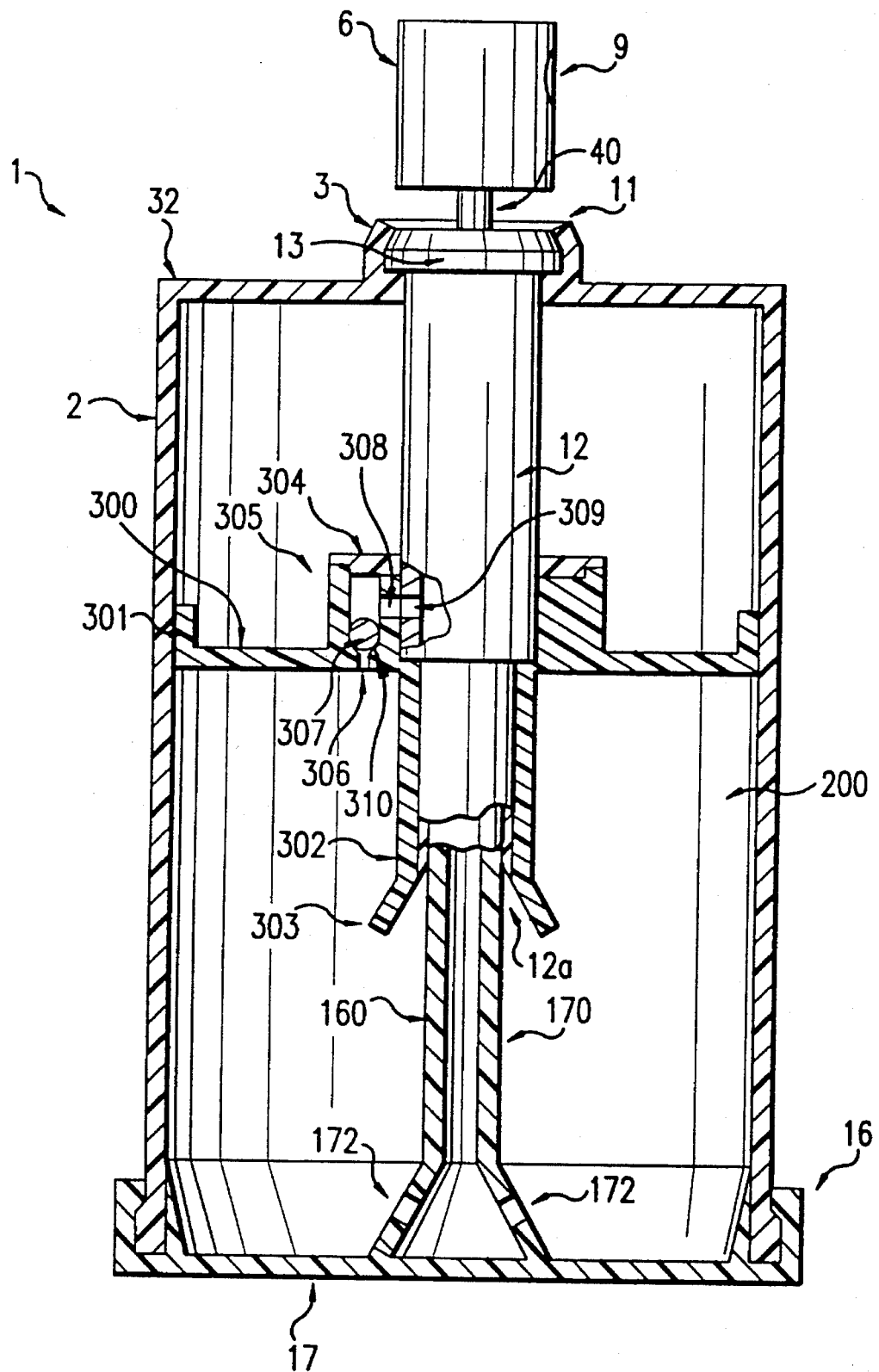
FIG. 18 is a cross-sectional view of a fourth embodiment of the present invention.

Another embodiment of the present invention is shown in cross-sectional view, in a sealed condition, in FIG. 18. The present invention includes a package 1 which includes a container portion 2. Container portion 2 includes a retaining opening 11 used to secure a pump 12 in the package 1. Pump 12 can be of any conventional design. Pump 12 includes a retention flange 13 for limiting the amount of inward movement of the pump 12 into the container 1. Retention flange 13 retains the pump 12 in the package 1 via a snap-fit engagement with retaining opening 11. Pump 12 is inserted into retaining opening 11 through the upper end of container portion 2o Pump 12 or container portion 2 can include energy directors for soncially welding pump 12 to container portion 2.

A bottom portion 17 is attached to lower end 16 of container portion 2. The mechanism for retaining bottom portion 17 to lower end 16 is described in detail above. Bottom portion 17 has molded integrally therewith a dip tube structure 160, which includes an upwardly-projecting tube 170, and a lower end 171 integrally molded with bottom portion 17. Lower end 171 includes one or more openings 172 which allow fluid to flow from the interior 200 of container portion 2 to the interior of tube 170.

Mounted to the exterior of the pump 12 and within the interior of container portion 2 is an insert 300. Insert 300 includes an exterior flange 301 which seals against the interior of container portion 2. Insert 300 also includes a interior flange 302 into which the bottom portion of pump 12 is fit. Interior flange 302 contains, at its bottom, an insertion flaring 303, which is described in detail below. An insert cap 304 is mounted on the upper end of insert 300. Insert 300 includes an inverted dispensing device 305, which is adapted to allow the dispenser 1 to dispense product when the dispenser 1 is in an inverted state. Inverted dispensing device 305 includes an inlet opening 306, a check valve 307, and an outlet opening 308. Outlet opening 308 cooperates with an inverted inlet opening 309 in the housing of the pump 12. Inverted inlet opening 309 is located below or axially inward of the inlet valve (not shown) to pump 12.

The method of using the device of the present invention is as follows. The container portion 2 is molded as an integral unit. Next, pump 12 is snapped or press-fit into retaining opening 11. Actuator 6 can then be inserted onto the outlet stem 40 of pump 12. The insert 300, with insert cap 304 mounted thereon, is then inserted through the bottom 16 of container portion 2 such that it slides along the interior wall of container portion 2 and over the bottom of pump 12.

The container portion 2 thus assembled is shipped together with bottom portion 17 in an unassembled condition to a filling and assembly location. When it is desired to fill package 1, container portion 2 is inverted, preferably by engaging shoulder 32 with a holding device. Container portion 2 is then filled with liquid product through open lower end 16. Bottom portion 17 is then placed on lower end 16. The tube 170 is inserted into the open bottom end 12a of pump 12, and insertion flaring 303 aids in guiding tube 170 into open bottom end 12a. As the tube 170 is inserted into the lower end 16 of filled container 12, liquid product travels into the tube 170, thereby forcing air in tube 170 out through openings 172. Bottom portion 17 is sealed to the lower end 16 of container portion, in any of the ways described above.

In an upright position of package 1, liquid product will be drawn into the openings 172 and up tube 170 in response to a pressure decrease within pump 12. Because the tube 170 is initially filled with liquid product, there is little difficulty in drawing up and purging any air trapped in tube 170, thereby making priming of pump 12 much simpler. Accordingly, the present invention is particularly adapted for use with products which normally make a pump hard to prime, i.e., viscous products.

In an inverted position of package 1, check valve 307 falls away from the sealing surface 310 immediately above inlet opening 306, thereby creating a fluid path from inlet opening 306 to outlet opening 308, and thereby to the interior of pump 12 through inverted inlet opening 309. Upon actuation of actuator 6 in an inverted position, therefore, liquid product will be drawn into pump through inverted inlet opening 309 to allow inverted dispensing.

Figure 19:
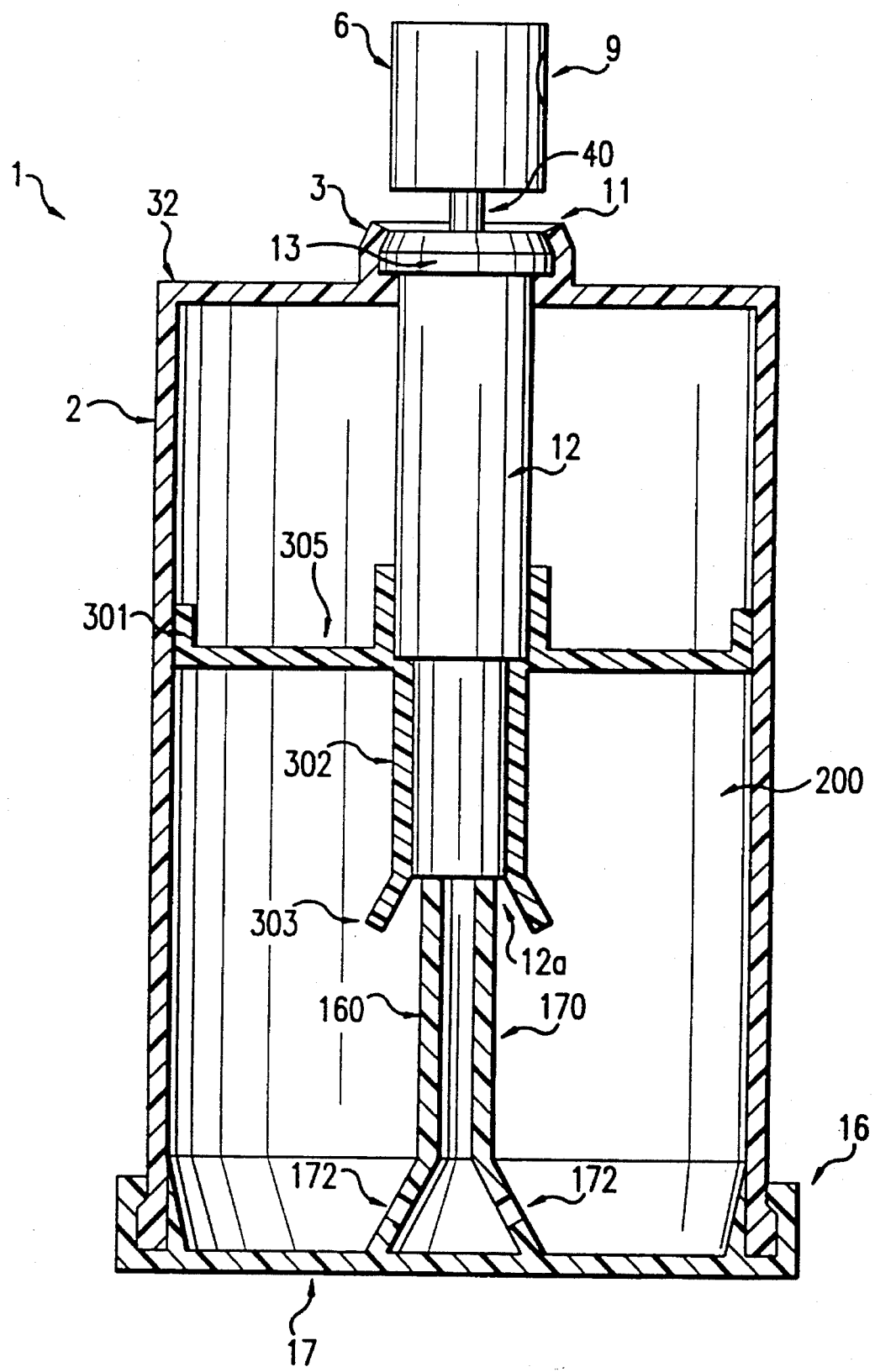
FIG. 19 is a cross-sectional view of a fifth embodiment of the present invention.

FIG. 19 shows another embodiment of the present invention. The embodiment of FIG. 19 is identical in structure and operation to the embodiment of FIG. 18, except that there is no inverted dispensing device 305 on the insert 300. Accordingly, the embodiment of FIG. 18 is not adapted to allow dispensing from package 1 when package 1 is in an inverted position.

Figure 20:
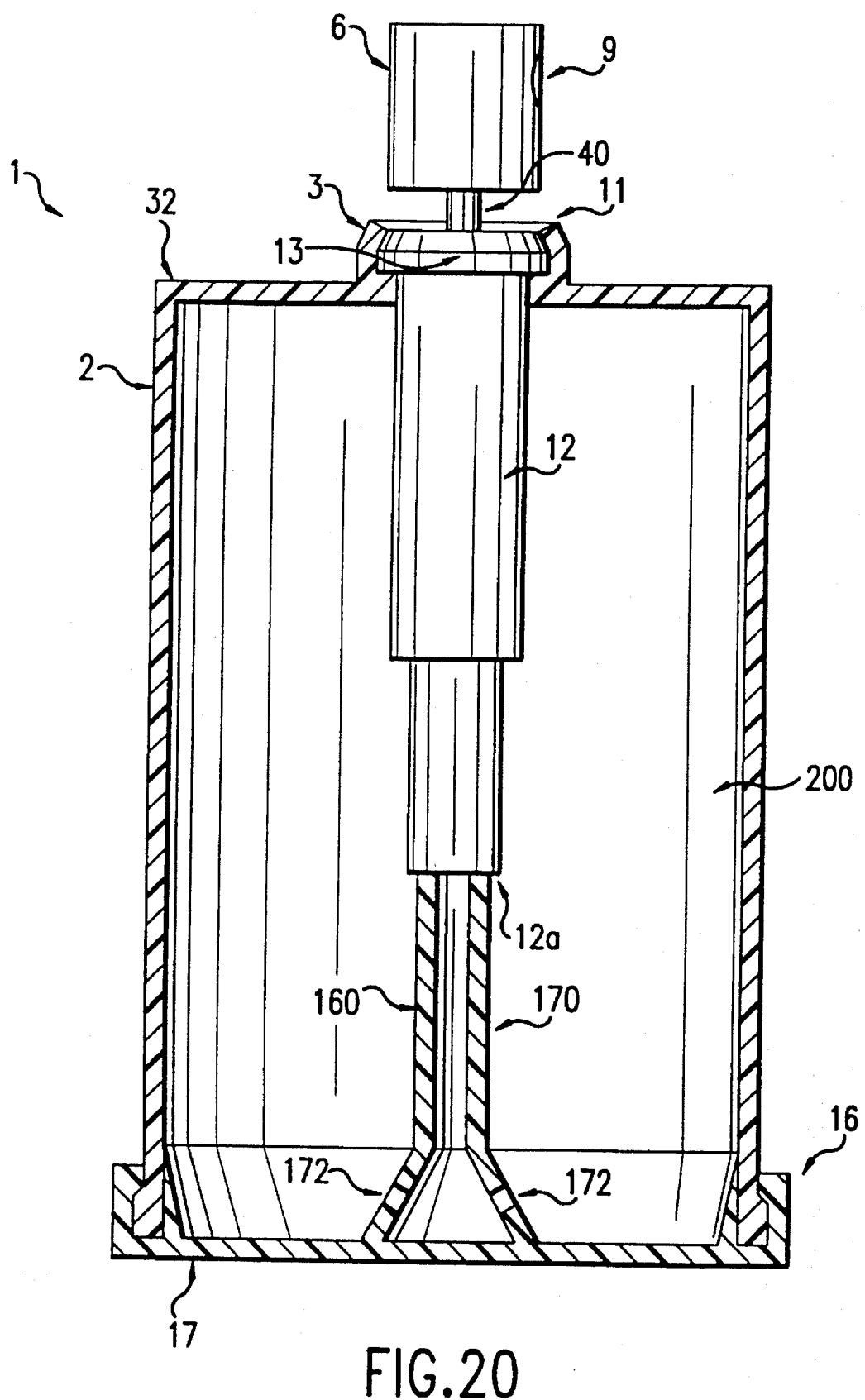
FIG. 20 is a cross-sectional view of a sixth embodiment of the present invention.
Figure 21:
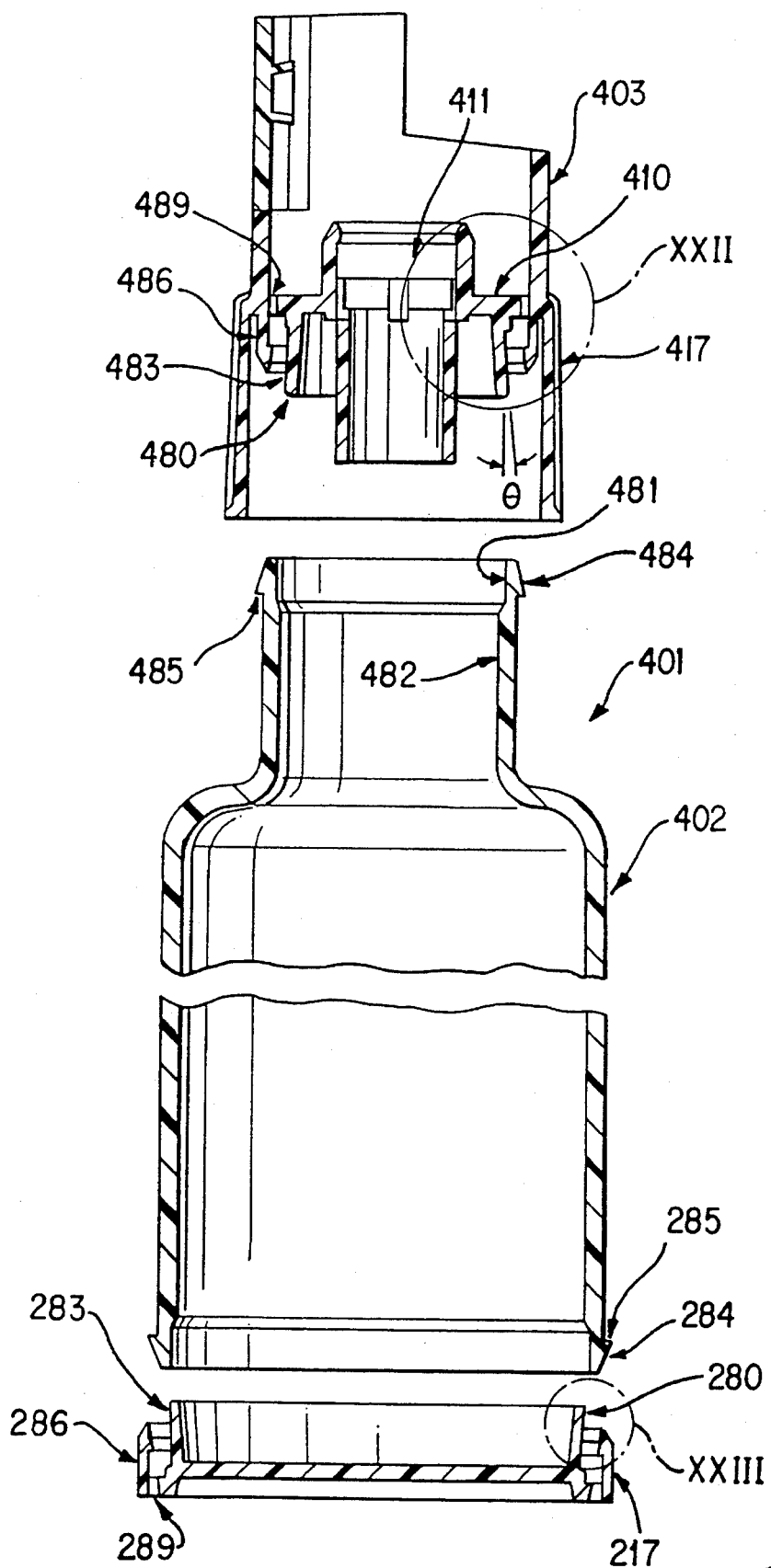
FIG. 21 is an exploded, cross-sectional view of a seventh embodiment of the present invention.
Figure 22:
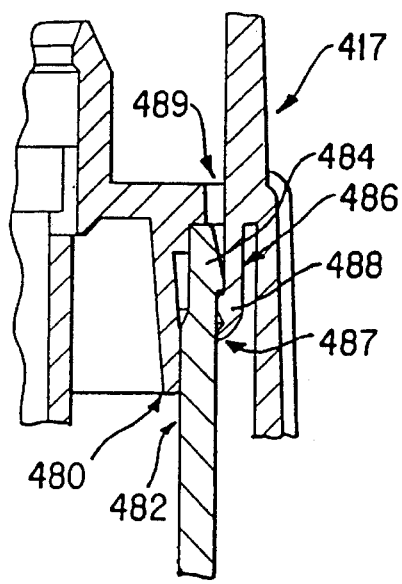
FIG. 22 is a detail, cross-sectional view of the connection between the mounting cup and the package of the embodiment of FIG. 21.
Figure 23:
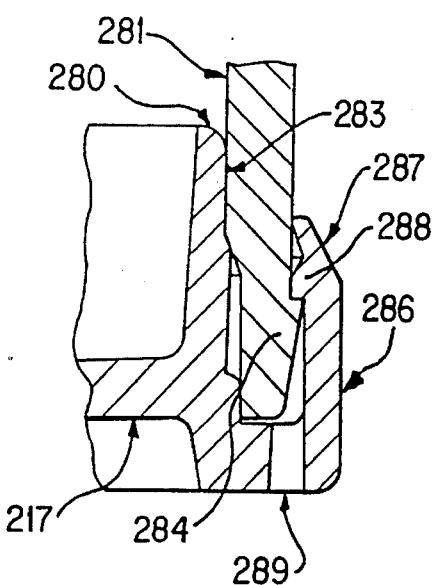
FIG. 23 is a detail, cross-sectional view of the connection between the bottom and the package of the embodiment of FIG. 21.
Figure 24:
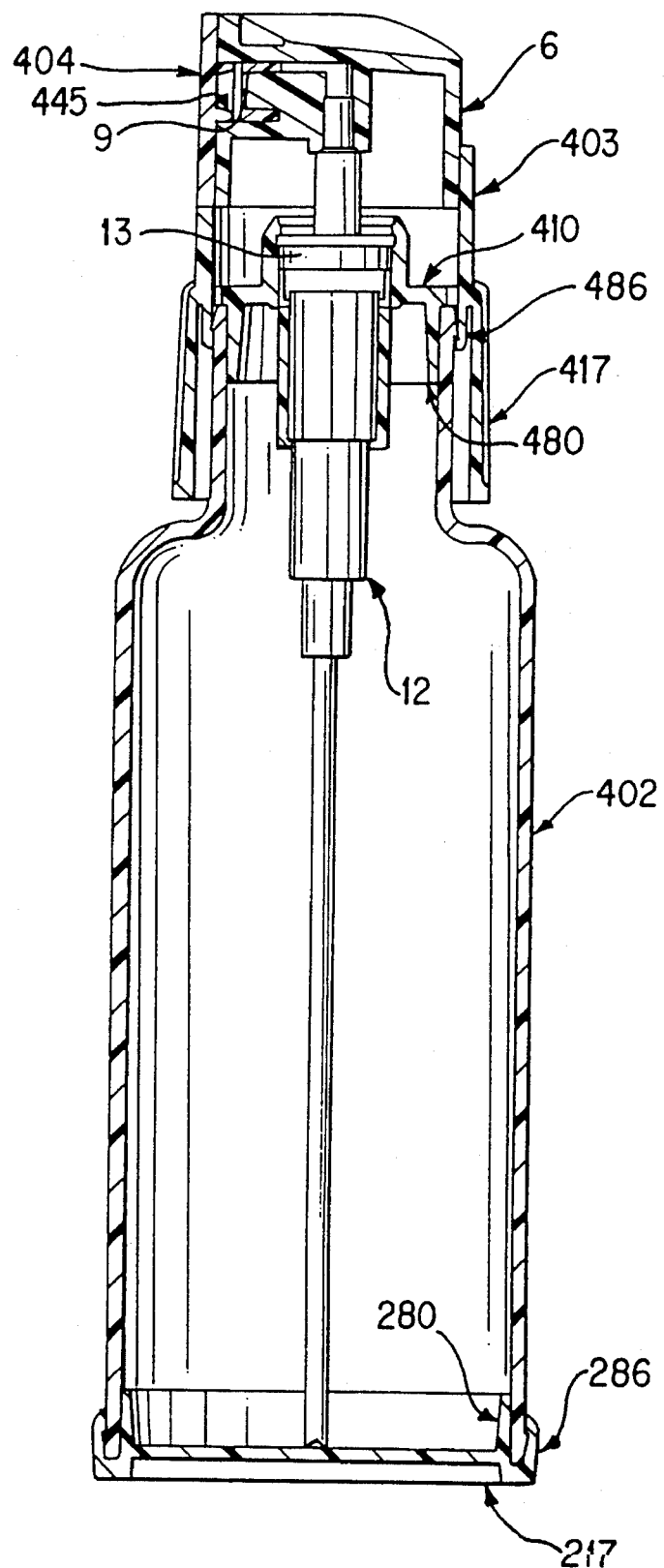
FIG. 24 is a cross-sectional view of an assembled package according to the embodiment of FIG. 21.

FIG. 20 shows a further embodiment of the present invention. The embodiment of FIG. 20 is identical in structure and operation to the embodiments of FIGS. 18 and 19, except that the embodiment of FIG. 20 does not include insert 300 or any of the structure of insert 300.

FIGS. 21–27 show another embodiment of the present invention. The embodiment of FIGS. 21–27 is especially useful for larger-size bottles or containers, in which the container portion 402 of the package 401 is made by manufacturing techniques other than injection molding, e.g., the container portion 402 is blow-molded. The lower end of package 401 is manufactured and assembled in an identical manner to the embodiment of FIGS. 12–14—i.e., the lower portion of container portion 402 includes a snap rim 284 with a snap surface 285. Similarly, the bottom portion 217 of package 401 is identical to that of FIGS. 12–14—i.e., bottom portion contains a snap flange 286 with snap lip 287 and a series of snap fingers 288, as well as openings 289 corresponding to snap fingers 288, and also includes an interior piston portion 280 with a sealing surface 283 for sealing on sealing surface 281 of container portion 402.

The embodiment of FIGS. 21–27 also includes a mounting cup 417 for mounting a pump 12 to the upper end of container portion 402. Mounting cup 417 includes a retaining wall 410 including a retaining opening 411 used to secure a pump 12 in the mounting cup 417. Pump 12 can be of any conventional design. Pump 12 includes a retention flange 13 for limiting the amount of inward movement of the pump 12 into the retaining opening 411 of the mounting cup 417. Retention flange 13 retains the pump 12 in the mounting cup 417 via a snap-fit engagement with retaining opening 411. Pump 12 is inserted into retaining opening 411 through the upper end of mounting cup 417. Pump 12 or mounting cup 417 can include energy directors for sonically welding pump 12 to mounting cup 417.

The mounting cup 417 in the embodiment of FIGS. 21–27 is particularly effective in ensuring a leakproof and easy-to-assemble mounting of pump 12 onto container portion 402 without the need for complicated molding of container portion 402. Mounting cup 417 includes an interior piston portion 480, which slides in and seals against an interior sealing surface 481 of container portion 402. Interior sealing surface 481 can be slightly inset from interior surface 482 of container portion 402. Interior piston portion 480 includes a tapered sealing surface 483 extending at an angle θ from vertical. Tapered sealing surface 483 ensures a good leakproof seal of interior piston portion 480 against interior sealing surface 481. Container portion 402 also includes, at its upper end, angled snap rim 484 extending around the entire circumference of container portion 402. Snap rim 484 includes a lower snap surface 485. Mounting cup 417 includes an exterior snap flange 486 which is used to secure and seal mounting cup 417 to container portion 402. Snap flange 486 includes, at its upper end, an angled snap lip 487 extending around the entire circumference of snap flange 486, and a series of snap fingers 488 spaced circumferentially around the interior of snap flange 486. Snap fingers 488 engage with snap surface 485 on snap rim 484 to thereby secure mounting cup 417 to container portion 402. Snap lip 487 generally contacts the exterior of container portion 402 to thereby ensure a good leakproof seal of mounting cup 417 to container portion 402. Mounting cup 417 may include openings 489 to allow proper molding of snap fingers 488 on snap flange 486.

The apparatus of FIGS. 21–27 can be assembled and filled in one of two ways. First, the pump 12 can be mounted to mounting cup 417 and then mounting cup 417 mounted to container portion 402. Container portion 402 may then be filled through the bottom, as described above, after which bottom portion 217 may be snapped onto container portion 402. Alternatively, the bottom portion 217 could be snapped to container portion 402 first (or, alternatively, the container portion 402 could be made with an integral bottom), the container portion 402 filled through the top, and then mounting cup 417, with pump 12 and actuator 6 already mounted thereon, could be snapped onto container portion 402.

Figure 25:
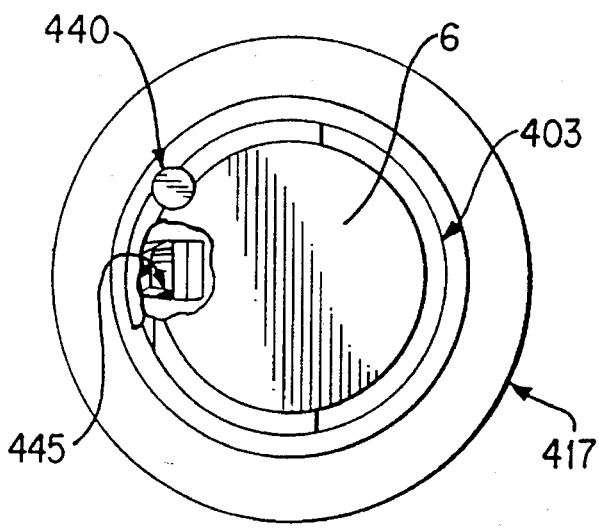
FIG. 25 is a top view of the actuator and mounting cup of the embodiment of FIG. 21.
Figure 26:
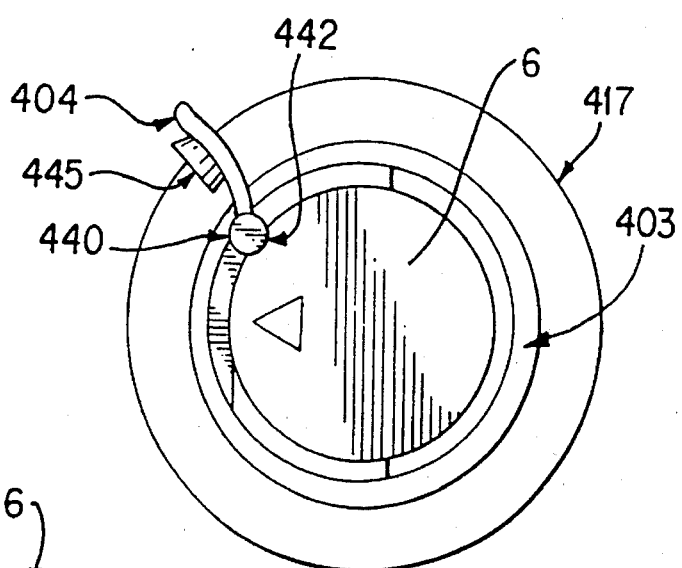
FIG. 26 is a partial cross-section of the view of FIG. 25.
Figure 27:
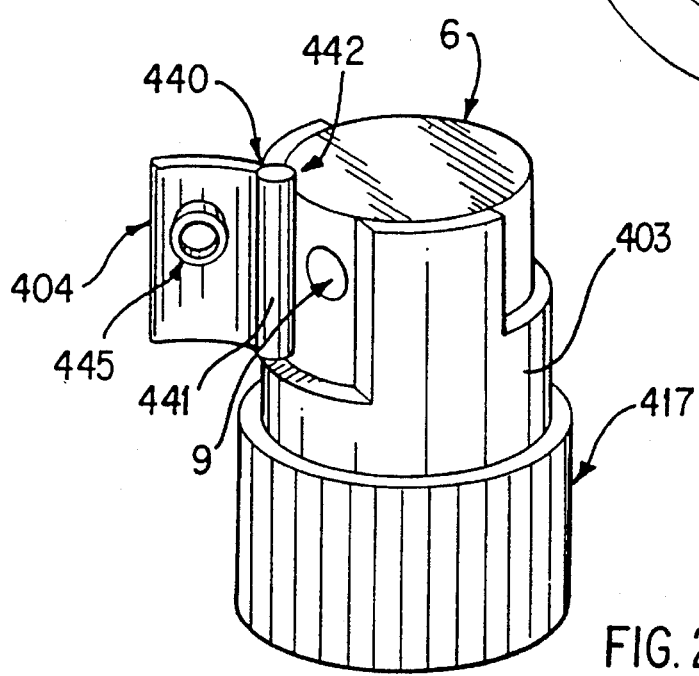
FIG. 27 is a perspective view of the actuator and mounting cup of the embodiment of FIG. 21.

FIGS. 25–27 show the details of the element for sealing the nozzle 9 on actuator 6. Upstanding wall 403 has mounted thereon, by way of a hinge connection 440, a sealing finger 404. Hinge connection 440 can be of any known type, including a molded pin on upstanding wall 403 fitting within a hole within the cylindrical portion 441 of sealing finger 404. Cylindrical portion 441 fits within a semi-circular recess 442 in actuator 6. The fit between cylindrical portion 441 and recess 442 ensures that actuator 6 is not rotated such that spray nozzle 9 is not aligned with spray opening 425 in upstanding wall 403. Sealing finger 404, when it is desired to dispense from package 401, is pivoted away from the spray nozzle 9, to the position shown in FIGS. 26 and 27. After dispensing, the sealing finger 404 is pivoted towards spray nozzle 9, so that an annular sealing rim 445 engages in an opening adjacent the spray nozzle 9. This engagement seals the nozzle 9 from the encroachment of air or other debris into spray nozzle 9, thereby preventing clogging of the nozzle 9 between dispensing strokes.

Figure 28:
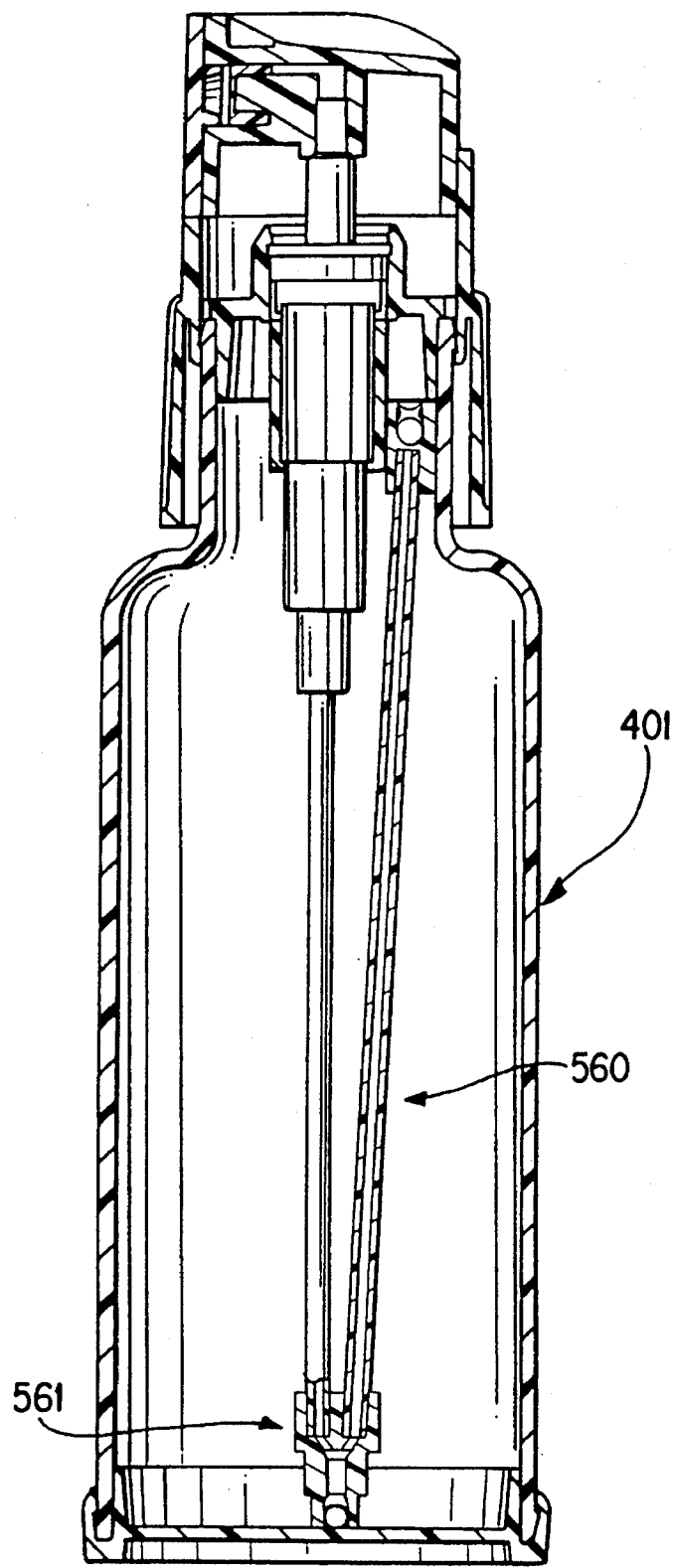
FIG. 28 is a cross-sectional view of an eighth embodiment of the present invention.
Figure 29:
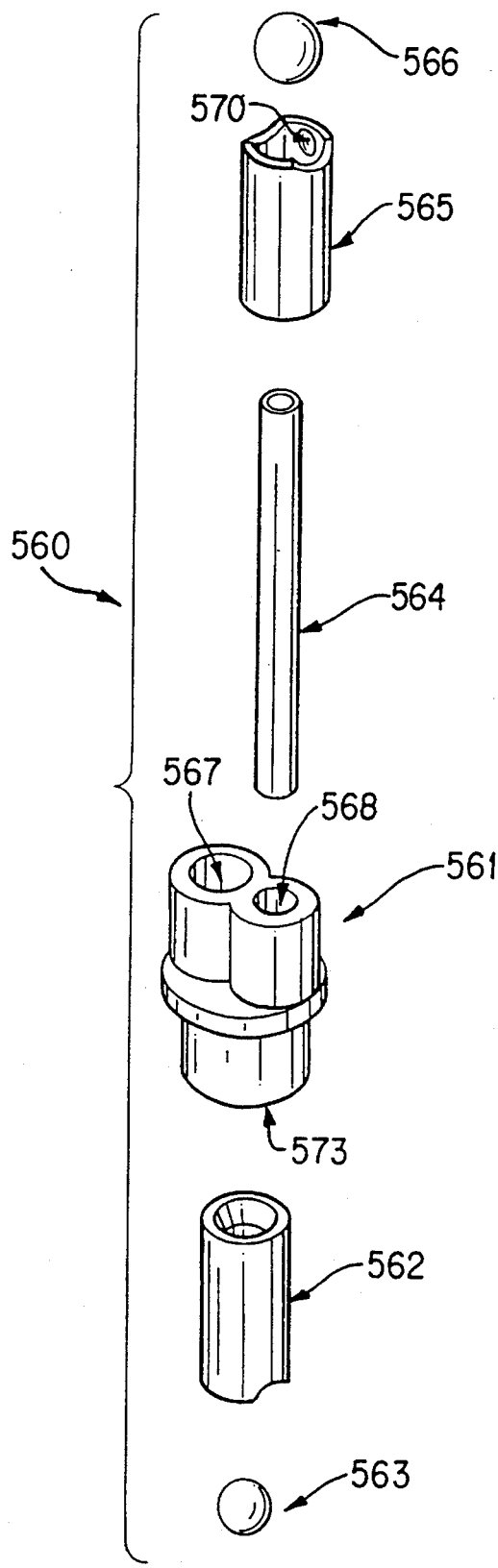
FIG. 29 is an exploded view of a inverted dispensing device of the present invention.
Figure 30:
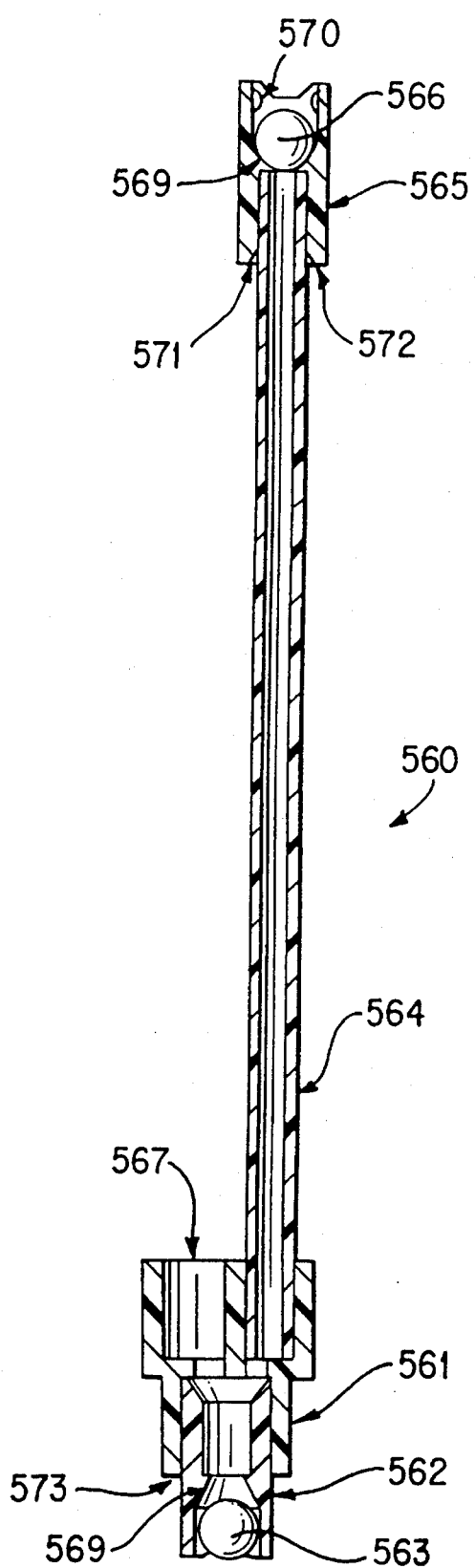
FIG. 30 is an assembled, cross-sectional view of the inverted dispensing device of FIG. 29.
Figure 31:
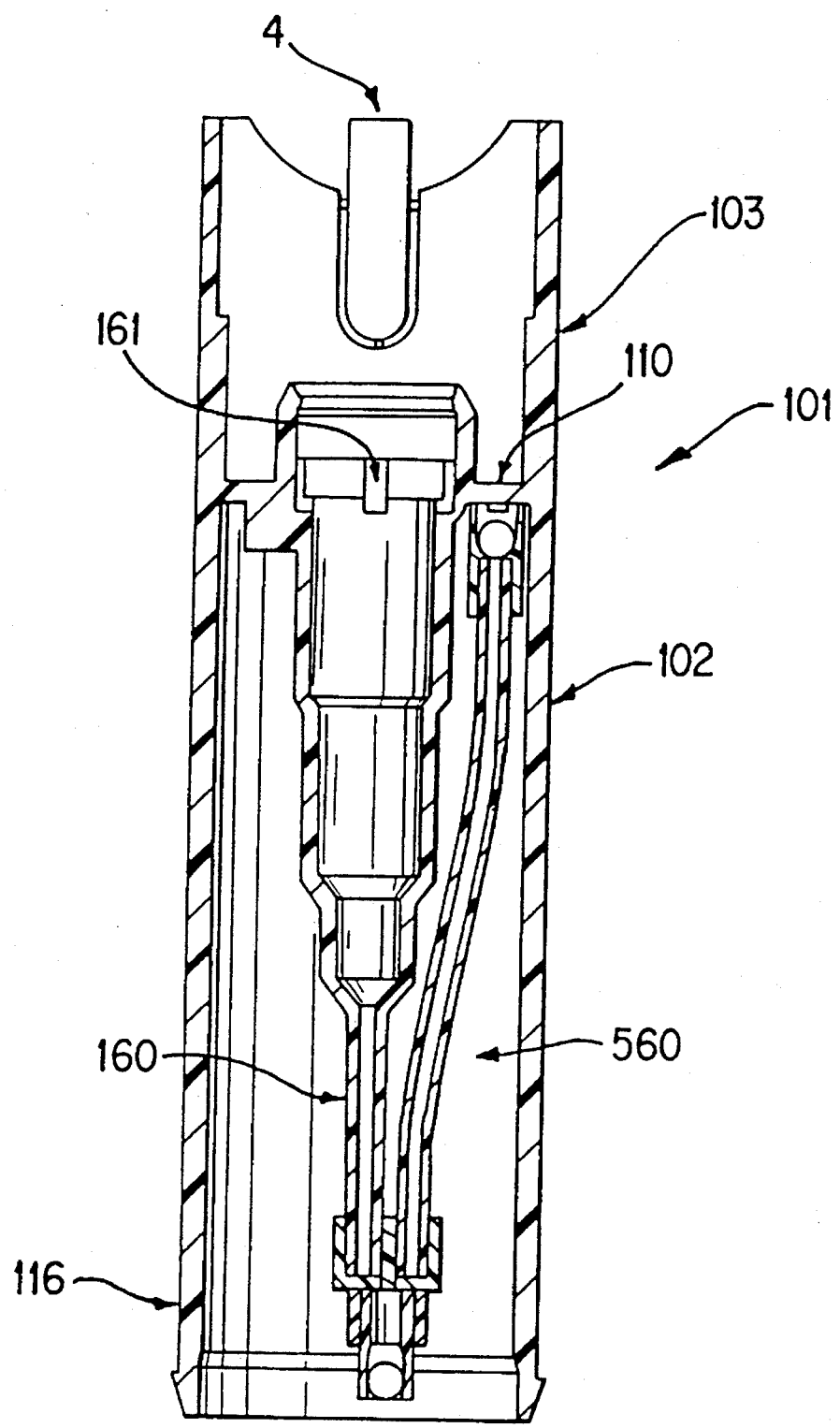
FIG. 31 is a cross-sectional view of the embodiment of FIG. 12 using the inverted dispensing device of FIGS. 29–30.
Figure 32:
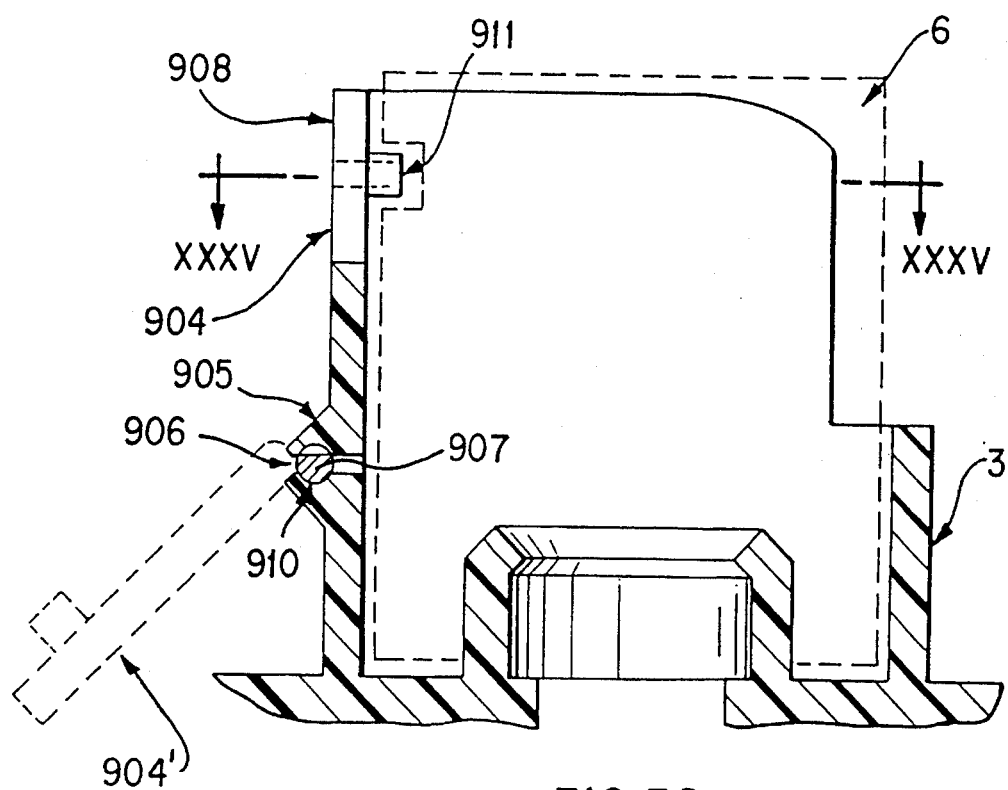
FIGS. 32 is a cross-sectional view of the upper end of the container of the present invention, showing two positions of the spray orifice sealing device.
Figure 33:
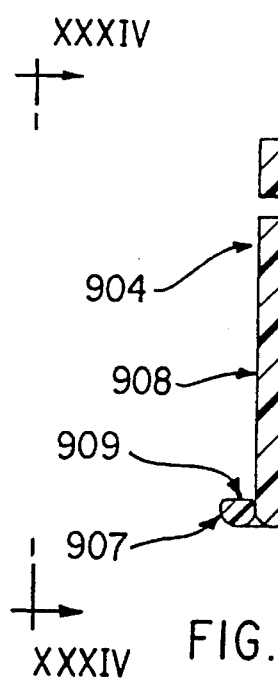
FIG. 33 is a cross-sectional view of the spray orifice sealing device of the present invention.
Figure 34:
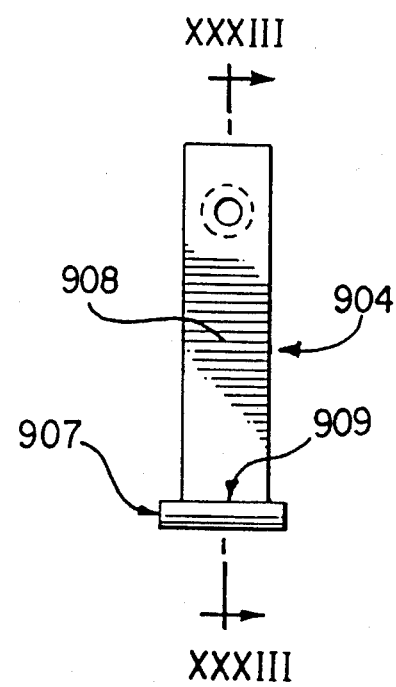
FIG. 34 is a front view of the spray orifice sealing device of the present invention.
Figure 35:
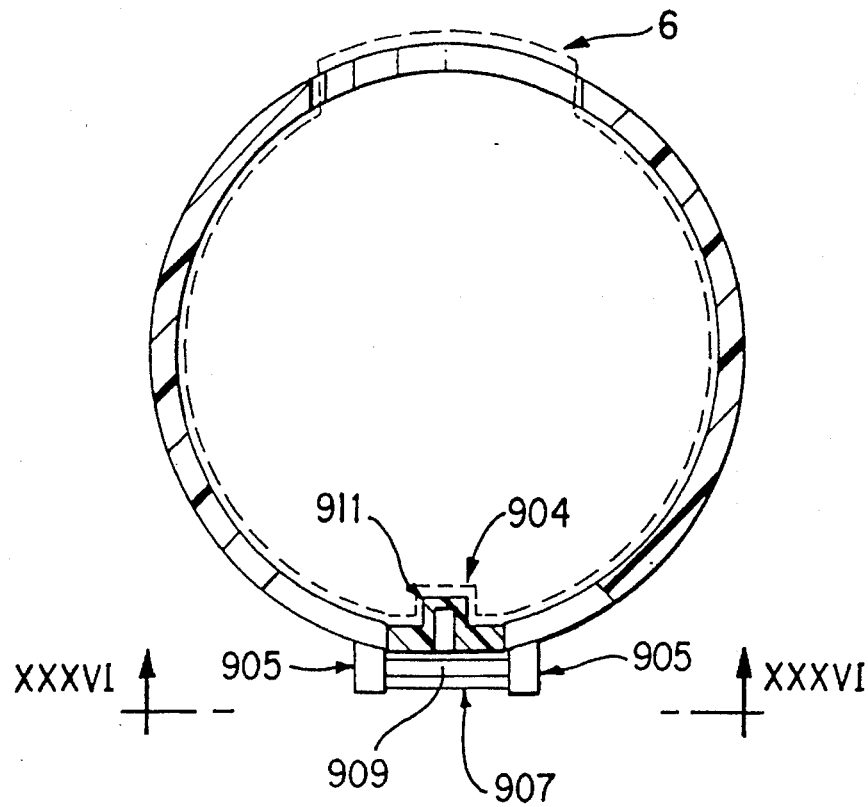
FIG. 35 is a top cross-sectional view of the upper end of the container of the present invention, showing the spray orifice sealing device.
Figure 36:
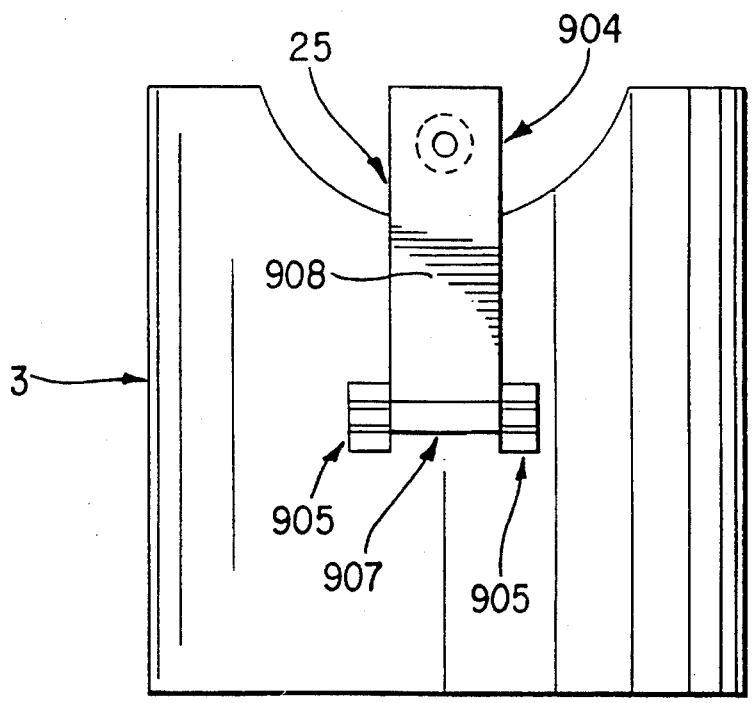
FIG. 36 is a front view of the of the upper end of the container of the present invention, showing the spray orifice sealing device.

FIG. 28 shows a cross-sectional view of the dispensing package 401 of FIGS. 21–27, with the inclusion of an inverted apparatus 560 to allow inverted dispensing from the dispensing package 401. FIGS. 29–30 show detail views of the inverted apparatus 560 shown in FIG. 28. Inverted apparatus 560 includes a dip tube adapter 561, a lower valve cage 562, a lower valve ball 563, an upper dip tube 564, an upper valve cage 565 and an upper valve ball 566. The first upper opening 567 of dip tube adapter 561 can be sized so as to securely receive a molded dip tube (as shown in FIG. 31 ), or so as to receive a conventional dip tube (as shown in FIG. 28) which is inserted into a pump. The second upper opening 568 of dip tube adapter 561 is sized so as to securely receive upper dip tube 564, manufactured of a conventional dip tube material. Upper valve cage 565 and lower valve cage 562 are essentially identical in construction; each includes a conical sealing surface 569 upon which balls 563 or 566 may seal, and projections 570 retaining balls 563 or 566 within valve cages 562 and 565, respectively. Upper valve cage 565 is mounted on the end of upper dip tube 564 opposite the end of upper dip tube 564 mounted in second upper opening 568. Upper valve cage 565 includes tapering 571 in outlet opening 572 for assisting in mounting of upper valve cage 565 on upper dip tube 564. Outlet opening 572 is sized so as to securely receive upper dip tube 564. Lower valve cage 562 fits securely in lower opening 573 of dip tube adapter 561.

In operation of the inverted apparatus 560, in an upright position of a dispenser, upper valve ball 566 seals against the conical sealing surface 569 in upper valve cage 565 under the action of gravity, thereby preventing the inlet of air or liquid into upper dip tube 564 and thereby into dip tube adapter 561 and the dip tube of the dispenser. Lower valve ball 563 is retained by projections 570 in lower valve cage 562, which projections allow liquid in the bottom of the dispenser to be drawn into the dip tube, upon a reduction in pressure in the dip tube, around lower ball valve 563. In an inverted position of the dispenser, lower valve ball 563 seals against the conical sealing surface 569 in lower valve cage 562 under the action of gravity, thereby preventing the inlet of air or liquid into dip tube through lower valve cage 562. Upper valve ball 566 is retained by projections 570 in upper valve cage 565, which projections allow liquid in the top of the dispenser to be drawn around lower ball valve 563, into the upper dip tube 564, through dip tube adapter 561 and into the dip tube of the dispenser, upon a reduction in pressure in the dip tube of the dispenser. As a result, the inverted apparatus 560 allows dispensing from the dispenser in both upright and inverted positions. The design of the inverted apparatus 560 is such that it is amenable to mass, high-speed assembly, and is adaptable to any number of dip tube sizes and configurations by merely substituting a different-sized dip tube adapter 561 into the assembly. The inverted apparatus 560 also does not require any modifications to the structure of the dip tube, pump or dispenser, and therefore can be easily adapted to any dispenser or pump size or style.

FIG. 31 shows a view of the dispenser of FIG. 12, which includes an integrally molded dip tube structure 160 cooperating with the inverted apparatus 560.

FIGS. 32–36 show the features of a spray orifice sealing device of the present invention. Upstanding wall portion 3 has mounted thereon, on opposite sides of the spray opening 25 lugs 905. Lugs 905 have a front opening 906 through which the sealing finger 904 lower end may be inserted. Sealing finger 904 includes a hinge element 907 mounted on a front surface 908 of sealing finger 904. Hinge element 907 includes a flattened surface 909, and other than flattened surface 909 is cylindrical in shape. Lugs 905 define an opening which is cylindrical in shape, except for a flattened section 910. Hinge element 907 therefore rotates in the opening in lugs 905, but snap-locks into the position shown as 904' when the flattened surface 909 interacts with flattened section 910. Sealing finger 904 includes a closure projection 911 which is shaped so as to sealingly fit within the opening surrounding the spray orifice on the actuator. Accordingly, in the position shown as 904 in FIG. 32, the closure portion 911 projects into, and seals, the opening around the spray orifice, preventing air from entering the spray orifice and drying out the liquid in the dispenser. This sealing prevents any potential clogging of the spray orifice. In the position shown as 904' in FIG. 32, the sealing finger 904 is snapped into a position away from the spray orifice, where the sealing finger 904 will not interfere with the spray from the spray orifice.

Sealing finger 904 is designed so that front surface 908 lies flush with the outer surface of upstanding wall 3. In addition, sealing finger 904 is easily inserted into lugs 905, thereby allowing easy interchangeability of sealing finger 904 onto upstanding wall 3, so that sealing fingers 904 having different colors, different closure portion 911 sizes and shapes, etc., may be placed on upstanding wall 3. Furthermore, sealing finger 904 completely fills the spray opening 25 when closure portion 911 is engaged with the spray orifice opening on the actuator so that dirt, sand, or lint does not clog spray opening 25.

It is to be understood that the description above is of preferred embodiments of the present invention, and that it is the claims of the present invention, and not the descriptions above, which define the present invention.

I claim:

1. A method of providing a dispensing container comprising the steps of:

providing a package comprising an open lower end and a retaining opening;

providing a pump structure;

inserting said pump structure into said retaining opening;

filling said package with a fluid product through said open lower end;

providing a bottom portion with an integrally-formed dip tube;

inserting said dip tube through said open lower end;

engaging an end of said dip tube with said pump structure; and attaching said bottom portion to said open lower end to thereby seal said fluid product in said package.

2. The method of claim 1, further comprising the step of:

inserting an insert onto said lower end of said pump structure after said step of inserting said pump structure into said retaining opening.

3. A dispensing package comprising:

an integrally formed container portion comprising:
- a lower portion and a retaining opening, said lower portion containing an open lower end;
- a pump structure, a circumferential outer surface of said pump structure being formed to be retained in said retaining opening; and
- a bottom portion, said bottom portion being formed separate from said container portion, said bottom portion being formed to be secured to said open lower end and sealed to said lower end, said bottom portion comprising an integrally-formed dip tube, said dip tube comprising an least one opening at an end of said dip tube adjacent said bottom portion, whereby said container portion can be filled with a liquid product through said open lower end, said dip tube inserted through said open lower end, and said bottom portion sealed to said lower end to seal said liquid product within said container portion.

4. The dispensing package of claim 3, further comprising:

an insert, said insert being secured to an axially inward end of said pump.

5. The dispensing package of claim 3, wherein:

said insert comprises an inlet passage, an outlet passage and a valve, said valve closing said inlet passage in a non-inverted position of said dispensing package, said inlet passage and said outlet passage providing fluid communication between an interior of said package and an interior of said pump in an inverted position of said dispensing package.

6. The dispensing package of claim 3, wherein:

said insert comprises a flared portion adjacent a lower end of said pump, said flared portion assisting insertion of an end of said dip tube into said lower end of said pump.

* * * * *